United States Patent
Kaufmann et al.

(10) Patent No.: US 10,961,957 B2
(45) Date of Patent: Mar. 30, 2021

(54) FILTER AND FILTER CARTRIDGE

(71) Applicant: MANN+HUMMEL GmbH, Ludwigsburg (DE)

(72) Inventors: Michael Kaufmann, Meckenheim (DE); Klaus-Dieter Ruhland, Meckenheim (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 16/439,847

(22) Filed: Jun. 13, 2019

(65) Prior Publication Data

US 2019/0293034 A1    Sep. 26, 2019

Related U.S. Application Data

(63) Continuation of application No. 15/382,701, filed on Dec. 18, 2016, now abandoned, which is a
(Continued)

(30) Foreign Application Priority Data

Jun. 18, 2014 (DE) .......................... 202014004894.0
Jun. 18, 2014 (DE) .......................... 202014004897.5
Nov. 11, 2014 (DE) .......................... 202014008899.3

(51) Int. Cl.
*B01D 46/00* (2006.01)
*B01D 46/52* (2006.01)
(Continued)

(52) U.S. Cl.
CPC ....... *F02M 35/02416* (2013.01); *B01D 45/16* (2013.01); *B01D 46/0005* (2013.01);
(Continued)

(58) Field of Classification Search
CPC .... B01D 46/00; B01D 46/52; B01D 46/0049; B01D 46/0023; B01D 46/527;
(Continued)

(56) References Cited

U.S. PATENT DOCUMENTS 7,481,863 B2 * 1/2009 Oelpke .............. B01D 46/0098
                                             55/521
7,972,402 B2 * 7/2011 Babb ..................... B01D 39/18
                                             55/499
(Continued)

FOREIGN PATENT DOCUMENTS

GB      2092296 A      8/1982
WO    2010019797 A1   2/2010
WO    2011115973 A2   9/2011

*Primary Examiner* — Minh Chau T Pham
(74) *Attorney, Agent, or Firm* — James Hasselbeck

(57) ABSTRACT

A filter cartridge for a filter for filtering of fluid is provided with an inflow surface, an outflow surface, and a main flow direction extending from the inflow surface to the outflow surface. A filter body is provided. A filter cartridge frame supports the filter body. A seal is disposed on the filter cartridge frame in the area of the outflow surface and separates a filter interior of a filter into a clean side and a raw side. Another configuration of the filter cartridge is provided that has an edge protection extending externally circumferentially about the filter cartridge frame in the area of the inflow surface. The edge protection connects the filter body and the filter cartridge frame with each other.

13 Claims, 19 Drawing Sheets

Related U.S. Application Data continuation of application No. PCT/EP2015/063542, filed on Jun. 17, 2015.

(51) Int. Cl.
| | | |
|---|---|---|
| *F02M 35/02* | (2006.01) | |
| *F02M 35/024* | (2006.01) | |
| *B01D 46/10* | (2006.01) | |
| *B01D 46/42* | (2006.01) | |
| *B01D 50/00* | (2006.01) | |
| *F02M 35/08* | (2006.01) | |
| *F02M 35/104* | (2006.01) | |
| *B01D 45/16* | (2006.01) | |

(52) U.S. Cl.
CPC ......... *B01D 46/0023* (2013.01); *B01D 46/10* (2013.01); *B01D 46/4227* (2013.01); *B01D 46/522* (2013.01); *B01D 50/002* (2013.01); *F02M 35/0201* (2013.01); *F02M 35/024* (2013.01); *F02M 35/0216* (2013.01); *F02M 35/0245* (2013.01); *F02M 35/02475* (2013.01); *F02M 35/02491* (2013.01); *F02M 35/08* (2013.01); *F02M 35/104* (2013.01); *B01D 2271/022* (2013.01); *B01D 2271/027* (2013.01); *B01D 2275/206* (2013.01); *B01D 2279/30* (2013.01)

(58) Field of Classification Search
CPC .. F02M 35/02; F02M 35/024; F02M 35/0245; F02M 35/02483; F02M 35/0216
USPC ...... 55/385.3, 498, 502, 521, 529; 123/198 E
See application file for complete search history.

(56) References Cited

U.S. PATENT DOCUMENTS

| | | | | |
|---|---|---|---|---|
| 8,206,483 | B2* | 6/2012 | Rieger | B01D 46/0002 55/498 |
| 2015/0013288 | A1* | 1/2015 | Hasenfratz | B01D 46/10 55/497 |
| 2016/0108866 | A1* | 4/2016 | Dewit | F02M 35/02433 55/385.3 |

* cited by examiner

FILTER AND FILTER CARTRIDGE

CROSS-REFERENCE TO RELATED APPLICATIONS

This application is a continuation of U.S. application Ser. No. 15/382,701, filed 18 Dec. 2016, now abandon, which is a continuation application of international application No. PCT/EP2015/063542 having an international filing date of 17 Jun. 2015 and designating the United States, the international application claiming a priority date of 18 Jun. 2014, based on two prior filed German patent applications Nos. 20 2014 004 897.5 and 20 2014 004 894.0, and a priority date of 11 Nov. 2014, based on prior filed German patent application No. 20 2014 008 899.3, the entire contents of the aforesaid US application, the international application and the aforesaid three German patent applications being incorporated herein by reference.

BACKGROUND OF THE INVENTION

The present invention concerns a filter, in particular for internal combustion engines, for filtering a fluid, in particular air, as well as a filter cartridge, in particular for such a filter.

In particular in construction and agricultural machines, engine air filtration is becoming more and more important. On the one hand, more and more efficient air filters are used because higher engine performances and stricter emissions standards require an increased air throughput through the engine. On the other hand, the number of component groups that are installed by default, such as air-conditioning devices, increases. This reduces the available installation space in the vehicle. Finally, there is the desire to design vehicles smaller and more lightweight which also is done at the expense of the available installation space.

When used in construction or agricultural machines, vibrations are transmitted onto the filter in different operating states. It is therefore a primary goal to arrange the main filter cartridge in the filter so as to be vibration-resistant. But also for a secondary filter cartridge arranged downstream a secure seat is important during operation.

It is an object of the invention to provide a filter, in particular for internal combustion engines, for filtering a fluid, in particular air, that even under extreme operating conditions exhibits high reliability.

In the aforementioned application situations, it is necessary to design the overall construction of a filter cartridge as robust as possible. Protection of the filter medium in operation is a primary concern. In the configuration of such filter cartridges, also possible handling preferences upon change of the filter cartridge or for servicing are be taken into consideration.

It is thus a further object of the invention to provide a filter cartridge that even for extreme operating conditions and handling preferences ensures a reliable filtering function.

For use in vehicles that have only little installation space for filtration purposes, in general so-called compact air filters are used that can be flowed through inline. This means that the inflow direction and the outflow direction extend parallel and are substantially aligned with each other. Often, the air which is exiting from the air filter, depending on the application situation, must be deflected after having passed the filter. For this purpose, for example, a pipe elbow can be arranged downstream of the filter housing. However, such downstream components increase again the required installation space of the entire arrangement.

It is a further object of the invention to provide a filter, in particular for internal combustion engines, for filtering a fluid, in particular air, which requires less installation space for a comparable filter performance.

The aforementioned objects are solved respectively by different aspects of the embodiments of a filter described in the following, in particular for internal combustion engines, for filtering a fluid, in particular air, as well as a filter cartridge, in particular for such a filter. As can be seen in the embodiments, the different aspects can be provided advantageously individually or combined in embodiments wherein, in case of combination, individual aspects enhance the advantages of other aspects and a synergistic interaction leads to an advantageous product.

SUMMARY OF THE INVENTION

The object is solved by a filter cartridge for a filter for filtration of a fluid, in particular of air, in particular for an internal combustion engine, that comprises an inflow surface, an outflow surface as well as a main flow direction, a filter body, and a filter cartridge frame supporting the filter body, wherein the filter cartridge frame in the area of the outflow surface comprises a seal for separation of a filter interior into clean side and raw side, and comprises a spacer structure for securing a spacing between the filter cartridge frame and a further filter cartridge that can be arranged downstream in the main flow direction.

Further embodiments of the invention are disclosed in the dependent claims.

The filter cartridge according to the invention comprises an inflow surface, an outflow surface, as well as main flow direction, a filter body, and a filter cartridge frame supporting the filter body. The filter cartridge frame, in the area of the outflow surface, comprises a seal for separating a filter interior in clean side and raw side and a spacer structure for determining a spacing between the filter cartridge frame and a further filter cartridge that can be positioned downstream. By means of the spacer structure, a prior determined spacing between filter cartridge, that can be, for example, a main filter cartridge, and a further filter cartridge arranged downstream, that is, for example, a secondary filter cartridge, is maintained even under extreme conditions of use, for example, vibrations. This ensures that the further filter cartridge cannot move out of its designated position and thereby lose its sealing function and securing function.

In one embodiment of the invention, it is provided that the spacer structure is arranged within the seal, in particular at several locations along the seal, and in particular at the circumference of the outflow surface. For such a configuration it can be provided that the outer circumference perpendicular to the main flow direction of the further filter cartridge follows in shape and size the seal and therefore provides a support surface for the spacer structure.

An advantageous embodiment of the invention provides that the outflow surface or/and a sealing surface of the seal are positioned relative to the main flow direction at an angle between 5° and 45°, in particular an angle of 24°±10° and in particular an angle of 24°±5°. An outflow surface which is angled in such a way to the main flow direction has a larger surface area compared to an outflow surface. Generally, the angled arrangement of the outflow surface or/and of the sealing surface provides the possibility of effecting a deflection of the main flow direction already within the filter cartridge or directly downstream of the filter cartridge. This saves installation space and improves the pressure loss within the filter as a result of shorter flow distances.

Advantageously, the spacer structure is formed integrally with the seal, in particular is molded with the seal. This enables, for example, the use of the same material and manufacture of the spacer structure in the same processing step used for the seal.

A particularly preferred embodiment provides that the spacer structure is designed to exert in the installed state of the filter cartridge a clamping or holding force on a further filter cartridge which can be arranged downstream in the main flow direction, in particular a secondary filter cartridge, wherein the force presses the further filter cartridge into its installation position. This can be achieved, for example, in that the spacer structure is made of an elastic material. When the filter cartridge is then inserted after the further filter cartridge, already the insertion can exert a force on the further filter cartridge by suitable selection of an appropriate geometry. This improves, in turn, the reliability of the filter because the further filter cartridge is permanently exposed to a force which keeps it in its designated position.

In a preferred embodiment of the invention, the seal acts axially in the direction of the main flow direction. This means that the force which is to be applied for the sealing action is extending parallel to the outflow direction.

In an embodiment of the invention, the filter body is embodied as a filter bellows, in particular with variable fold height. By means of the variable fold height, for example, an outflow surface that is extending at a slant to the main flow direction can be realized. A configuration of a zigzag-shaped folded filter body is understood as variable fold height when the fold heights across a length of the folded bellows defined by the sequence of fold edges is not constant but changes continuously or discontinuously or differs in neighboring sections. Preferably, the height of the folds changes continuously, and further preferred linearly, across the length of the bellows.

The object is also solved by a filter for filtering a fluid, in particular air, in particular for an internal combustion engine. The filter according to the invention comprises a filter housing into which a main filter cartridge and a secondary filter cartridge can be inserted. The main filter cartridge comprises an inflow surface, an outflow surface as well as a main flow direction, a filter body and a filter cartridge frame supporting the filter body. The secondary filter cartridge can be arranged downstream of the main filter cartridge. The filter cartridge frame comprises in the area of the outflow surface a seal for separating the filter housing in clean side and raw side as well as a spacer structure for determining a spacing between the filter cartridge frame and the secondary filter cartridge.

In an advantageous embodiment of the filter, it is provided that the filter housing has an insertion direction which is substantially perpendicular to the main flow direction. This enables after insertion of the secondary filter cartridge an insertion of the main filter cartridge in such a way that the secondary filter cartridge is blocked against moving out of its designated seat.

In a preferred embodiment, it is provided that the secondary filter cartridge comprises a seal for contacting the filter housing wherein the seal is in particular designed to be acting radially relative to the flow direction of the secondary filter cartridge. It is thus not required to provide a sealing surface on the filter housing in axial extension of the main flow direction of the secondary filter cartridge. Instead, already upon insertion into the designated seat, the seal is effective perpendicular to the main flow direction against the filter housing.

According to an embodiment of the invention, the secondary filter cartridge comprises a secondary filter body and a secondary filter cartridge frame supporting the secondary filter body. In this context, it can be provided that, in the inserted state of the main filter cartridge and of the secondary filter cartridge, the spacer structure of the main filter cartridge contacts the seal or the secondary filter cartridge frame of the secondary filter cartridge. Accordingly, vibrations that occur in situations of use cannot cause the secondary filter cartridge to move out because the spacer structure of the main filter cartridge blocks the space through which the secondary filter cartridge has been inserted.

In a further embodiment which is also an invention on its own, the filter cartridge according to the invention for a filter for filtering a fluid, in particular air, in particular for an internal combustion engine, comprises an inflow surface, an outflow surface, a main flow direction, a filter body as well as a filter cartridge frame supporting the filter body. The filter cartridge frame comprises in the area of the outflow surface a seal for separating a filter interior of a filter in clean side and raw side and, in the area of the inflow surface, comprises an edge protection that is surrounding circumferentially the filter frame. The edge protection connects the filter body and the filter cartridge frame to each other. According to the invention, this provides thus a synergistic interaction of edge protection and of the connection of the filter body with the filter cartridge frame. This is particularly advantageous in the usual practice in the field of construction machines where filter cartridges are cleaned by blowing out or tapping.

In particular, in particularly preferred embodiment it is provided that the edge protection forms a seal-tight connection for the filtered fluid between filter body and filter cartridge frame. Accordingly, the connection of filter body and filter cartridge frame forms at the same time the sealing action of the filter body relative to the filter cartridge frame.

In an inventive further embodiment of the invention, it is provided that the filter cartridge frame in the area of the edge protection has cutouts that are filled out by the edge protection. This enables a particularly good mechanical connection between the edge protection and the filter cartridge frame.

Particularly preferred, the cutouts extend perpendicular to the main flow direction. It is thus not required to provide in the filter cartridge frame an angled member for the edge protection. Instead, the edge protection can be placed completely about the inflow-side edges of the filter cartridge frame and, at the same time, can penetrate the filter cartridge frame through the cutouts and, in this way, provide a particularly stable mechanical connection.

In a further embodiment of the invention, the filter cartridge frame surrounds the filter body. In addition, the filter cartridge frame determines the main flow direction of the filter cartridge.

A particularly preferred embodiment of the invention provides that the edge protection partially penetrates the filter body. In this way, after hardening of the edge protection, a particularly stable connection is provided between the edge protection and the filter cartridge frame, on the one hand, and the filter cartridge frame and the filter body, on the other hand.

A further embodiment of the invention provides that the filter body is embodied as a filter bellows, in particular with variable fold height. The variable fold height enables an angled position between outflow surface and main flow direction.

According to the invention, it can be provided that the outflow surface or/and a sealing surface of the seal is positioned relative to the main flow direction at an angle between 5° and 45°, in particular an angle of 24°±10° and in particular an angle of 24°±5°. The angle between main flow direction and outflow surface or sealing surface enables a particularly compact configuration because a deflection of the main orientation can be realized already within the filter housing that receives the filter cartridge.

A particularly preferred embodiment of the invention provides that the connection between filter body and filter cartridge frame is an adhesive connection which is formed as one part together with the edge protection. In particular, the adhesive connection and the edge protection can be formed of the same material, in particular of a polyurethane. This enables technical advantages in particular during manufacture because the adhesive connection between the filter cartridge frame and the filter body, the sealing action between filter body and filter cartridge frame, and the edge protection can be produced in one processing step and a particularly robust embodiment is created at the same time.

According to the invention, the edge protection is designed such that, when tapping the filter cartridge, the resulting forces can be at least partially absorbed by the edge protection and in particular damage of the filter cartridge can be prevented.

The filter cartridge according to the invention comprises a prismatic basic shape wherein the parallel arranged base face and top face have a polygonal basic shape. The filter cartridge comprises in accordance with the polygonal basic shape of the base and top faces at least three, preferably four lateral faces. A first lateral face neighbors a second lateral face. The first lateral face as well as preferably also the second lateral face are inflow surfaces. Alternatively, the first lateral face and preferably additionally the second lateral face are outflow surfaces. The first lateral face and the second lateral face are positioned substantially perpendicular to each other. Substantially encompasses an angle range of 80° to 100°. A third lateral face is preferably positioned substantially opposite the first lateral face and is spaced apart therefrom in the flow direction and, in contrast to the first and the second lateral faces, is an outflow surface when the first and the second lateral faces are inflow surfaces or the third lateral face is an inflow surface when the first and preferably the second lateral faces are outflow surfaces. The third lateral face is positioned relative to the first lateral face at an angle that is smaller than 80° and greater than 10° and is in particular between 70° and 20°. Particularly preferred are angles such as 45° or 60°.

In the following, the aforementioned first alternative is described in which the first and preferably also the second lateral faces are inflow surfaces and the third lateral face an outflow surface. The explanations apply analogously to the reverse situation of the second alternative in which the first and the second lateral faces are outflow surfaces and the third lateral face an inflow surface. For the described filter cartridge geometry, in general one lateral face provides an inflow surface where the main fluid flow impacts first. The second lateral face assists entry of the fluid into the filter cartridge and increases the inflow surface. The fluid flows out through the third lateral face. Since the third lateral face is slantedly positioned relative to the first lateral face, for a filter with such a filter cartridge there is the possibility to determine the outflow direction already within the filter housing in the desired way. An external deflection outside of the filter housing, for example, by means of a curved outflow socket, is no longer necessary. Thus, two advantages are achieved. On the one hand, a significantly increased inflow surface results which possibly provides for better utilization of the filter capacity. At the same time, the filter geometry according to the invention permits a deflection of the main flow direction within the filter cartridge so that the installation space which is required by the filter is optimized, i.e., can be reduced.

The main flow direction is understood as the average direction of the flow at one position of the path through the filter system and/or filter element. For example, the main flow direction within a cyclone block comprised of a plurality of inline cyclone cells is defined by the axial extension of the cyclone cells. When impacting on the inflow surface of a filter element, the main flow direction is substantially perpendicular to this inflow surface and in other respects is defined by the path of least resistance.

According to one embodiment, the polygonal basic shape is a triangle, preferably a quadrangle or a pentagon. The resulting prismatic basic shape, depending on the application situation, can also have slightly curved lateral faces. Also, inflow or outflow can be realized through the base face and/or top face of the prism.

A preferred further embodiment of the invention provides that the filter cartridge comprises a filter body with a zigzag-shaped folded filter medium. Such a folded filter medium comprises a large surface area and can be brought relatively inexpensively into the desired basic shape.

One embodiment provides that the folds have outer fold edges, which are positioned on the first lateral face and inner fold edges that are positioned opposite the outer fold edges and are positioned on the third lateral face. Accordingly, inflow into the filter cartridge is substantially realized perpendicular to the fold edges. The same holds true for the outflow wherein the third lateral face is positioned slantedly relative to the first lateral face.

In the described zigzag-shaped folding of the filter medium, the folds have at least one end face which is located on the second lateral face. Accordingly, inflow of the filter medium is realized through the fold edge as well as through the end face of the fold. The end faces in this case must be designed such that no direct inflow to the clean side of the filter cartridge can take place.

A particularly preferred embodiment of the invention provides that the depth of neighboring fold edges differs and in particular every other fold has the same depth. The different depths of neighboring fold edges enable a slanted configuration of the filter cartridge and, in this way, the embodiment of the desired geometry.

A particularly preferred embodiment of the invention provides that the folds each have two end faces. One end face of the folds is positioned on the second lateral face. The other end face of the folds is positioned on a fourth lateral face. The second lateral face is larger than the fourth lateral face. The fourth lateral face comprises more fold edges than the second lateral face, in particular twice as many. By doubling the fold edges on the fourth lateral face, it is possible to produce or adjust the angle between the third lateral face and the first lateral face.

The concept of the invention is also realized in a filter with a filter cartridge according to the invention. In such a filter it can be provided that the main inflow direction of the filter and the main outflow direction of the filter are positioned relative to each other at an angle of more than 30°, in particular more than 45°, preferably more than 60°, and especially 90°.

Alternatively, it can be provided that the main inflow direction of the filter is parallel and displaced relative to the main outflow direction of the filter. As a result of the slanted position, realized by the filter cartridge, of the outflow surface of the filter cartridge relative to the inflow surface of the filter cartridge, within the filter a deflection of the main inflow direction toward the main outflow direction can be realized such that the main outflow direction is positioned at an angle relative to the main inflow direction or is displaced by a certain length. This can be realized simply and inexpensively by appropriate outflow openings at the filter.

Another also advantageous further development of the invention provides a filter with a primary filter element according to the invention and a secondary filter element according to the invention. By configuring the primary and secondary filter cartridges with a prismatic basic shape, a particularly great freedom of deflection of the fluid flows in such a filter is created.

The filter according to the invention, in particular for internal combustion engines, for filtering a fluid, in particular air, comprises a filter housing with a raw-side area and a clean-side area. A main filter element is insertable into the filter housing and comprises a main filter element inflow surface, a main filter element flow direction, a main filter element outflow surface as well as a seal arranged on a sealing surface. For example, the main filter element can have a prismatic basic shape. In particular, a flow through the lateral faces can be realized. The seal serves for fluid-tight separation of the raw-side area of the filter housing from the clean-side area of the filter housing. Moreover, the filter comprises a secondary filter element arranged downstream of the main filter element and provided with a secondary filter element inflow surface, a secondary filter element flow direction, and a secondary filter element outflow surface. The sealing surface is positioned at a slant to the main flow direction of the main filter element. The slanted sealing surface makes available within the filter housing downstream of the main filter element a space in which, on the one hand, the secondary filter element can be arranged. At the same time, due to the sealing surface positioned at a slant relative to the main flow direction, a deflection of the main flow direction is already realized in the filter housing. Accordingly, with a suitable arrangement of an outflow opening on the filter housing, a deflection of the fluid flow in the desired direction can be realized. It is thus possible to eliminate the otherwise required pipe elbow or the like downstream of the housing.

The sealing surface and the main flow direction can be positioned in particular at an angle that is between 85° and 10°. Within this angle range, a noticeable deflection of the fluid flow occurs.

One embodiment of the invention provides that the sealing surface is curved and in particular is positioned on a lateral cylinder surface. By means of a concave configuration of the sealing surface, viewed from the main filter element, the installation space available for the main filter element is optimized and provides sufficient space for a secondary element with a suitable selection of the radius of curvature. At the same time, due to the curvature of the sealing surface, the outflow direction of the filter housing, depending on the position of the outflow opening, can be determined in a particularly simple way. Preferably, the axis of the cylinder of the lateral cylinder surface is perpendicular to the main filter element flow direction and perpendicular to the secondary filter element flow direction.

Alternatively, the sealing surface can be positioned in a plane.

A preferred embodiment of the invention provides that the sealing surface and the main filter element outflow surface extend parallel. In this way, a clearly defined separation plane between the raw side and the clean side of the filter housing is provided. At the same time, for a curved embodiment of the sealing surface, an installation space-optimized configuration of the filter interior and thus of the entire filter is provided.

Preferably, it is provided that the secondary element inflow surface is extending parallel and spaced-apart relative to the sealing surface. In this way, it is ensured that upon change of the secondary filter element the clean side of the filter housing does not become soiled. In a curved configuration of the sealing surface, a secondary element inflow surface is provided that is also curved.

In a preferred embodiment of the invention, the basic shape of the secondary filter element is a parallelepiped. This enables a simple construction of the secondary element, for example, from a flat element with straight folds in which the fold edges at the inflow side and outflow side each form planes that are preferably positioned parallel to each other at a spacing defined by the fold height.

Alternatively, the basic shape of the secondary element can be a prism with one or several curved lateral faces such as, for example, a hollow lateral cylinder sector. This can be realized, for example, by a curved flat bellows. This shape provides the possibility of adapting the secondary filter element to a curved main filter element outflow surface and to thereby further optimize the installation space.

In a preferred embodiment of the invention, the basic shape of the main filter element is a prism. In particular, the base face and the top face of the prism can be a quadrangle or a pentagon. The quadrangle or the pentagon can have two or three right angles, an acute and an obtuse angle. A preferred embodiment of the invention provides that a lateral face of the prism, viewed from the exterior, is convexly curved so that a main filter element outflow surface results which is embodied as a lateral cylinder surface, for example.

An advantageous embodiment of the invention provides that the main filter element is a folded bellows with at least two different fold depths. By means of two different fold depths, the main filter element outflow surface that is slanted relative to the main flow direction of the main filter element can be realized at the fold end faces. Alternatively, by a continuously increasing fold height the main filter element outflow surface that is slanted relative to the outflow direction of the main filter element can be realized at the fold edges. The terms fold depth and fold height are synonymously used herein.

An advantageous embodiment of the invention provides that the filter housing has an inflow direction, an outflow direction, as well as an outflow area with an outflow opening. An outflow socket can be attached to the outflow area wherein the outflow area comprises a fastening surface for the outflow socket and the fastening surface is positioned at an angle of 45° relative to the main filter element flow direction. The fastening surface which is slanted by 45° relative to the main flow direction is located particularly preferred in an arrangement on the filter housing in such a way that it is positioned, viewed in the main filter element flow direction, within the filter housing, i.e., it does not project past it. At the same time, this fastening surface, viewed in a direction perpendicular to the main flow direction of the main filter element, i.e., for example, in an insertion direction of the main filter element, is located below the main filter element. An outflow socket which is mounted on this fastening surface can now distribute the outflowing filtered fluid comparatively easily in any directions.

A particularly preferred embodiment of the invention provides that the outflow socket is formed such that a deflection of the flow direction by 45° results. In this way, only the orientation of the outflow socket on the outflow area, in particular on the fastening surface, is relevant with respect to the final outflow direction. This enables in a particularly advantageous way the determination of the outflow direction of the filtered fluid with a single component, i.e., the outflow socket. The final outflow direction of the filter housing results by suitable orientation of the outflow socket on the fastening surface.

A preferred further embodiment of the invention provides that the outflow socket comprises a rotation-symmetrically embodied fastening area for attachment on the fastening surface of the filter housing. Accordingly, by rotation of the outflow socket the final determination of the outflow direction of the entire filter housing can be determined. In this way, an angle range between 0° and 90° results between the inflow direction of the filter housing and the outflow direction of the filter housing with one and the same components.

In the same way, it may be determined that the outflow direction and the fastening surface are positioned at an angle of 45° relative to each other.

An alternative further embodiment of the concept of the invention provides that the fastening surface is positioned on a lateral cylinder surface. The axis of the cylinder is positioned in this context preferably perpendicular to the main flow direction of the main filter element. Such a curved fastening surface is preferably combined with a correspondingly curved fastening area of an outflow socket. The position of the outflow socket at the outflow area then determines the outflow direction of the filter housing.

Preferably, the fastening surface and the secondary element outflow surface extend parallel. This enables an extremely high integration and thus installation space optimization.

According to the invention, in an embodiment it can be provided that the main filter element is insertable and removable along an insertion axis into the filter housing wherein the insertion axis is positioned relative to the main flow direction at an angle between 90° and the angle at which the sealing surface and the main flow direction are positioned relative to each other. According to this embodiment, the filter housing has a cover that is designed such that, in the state in which it closes off the filter housing, it exerts a force on the main filter element in the direction of the sealing surface. Due to the slanted position of the sealing surface, this force is at least partially converted into an axial force, i.e., into a force which is acting in the direction of the main flow direction. This provides a force which presses the main filter element with its seal mounted on the sealing surface against a main filter element seat on the filter housing.

BRIEF DESCRIPTION OF THE DRAWINGS

The invention will now be explained in more detail with reference to the drawings.

PREFERRED EMBODIMENT OF THE INVENTION

Figure 1:
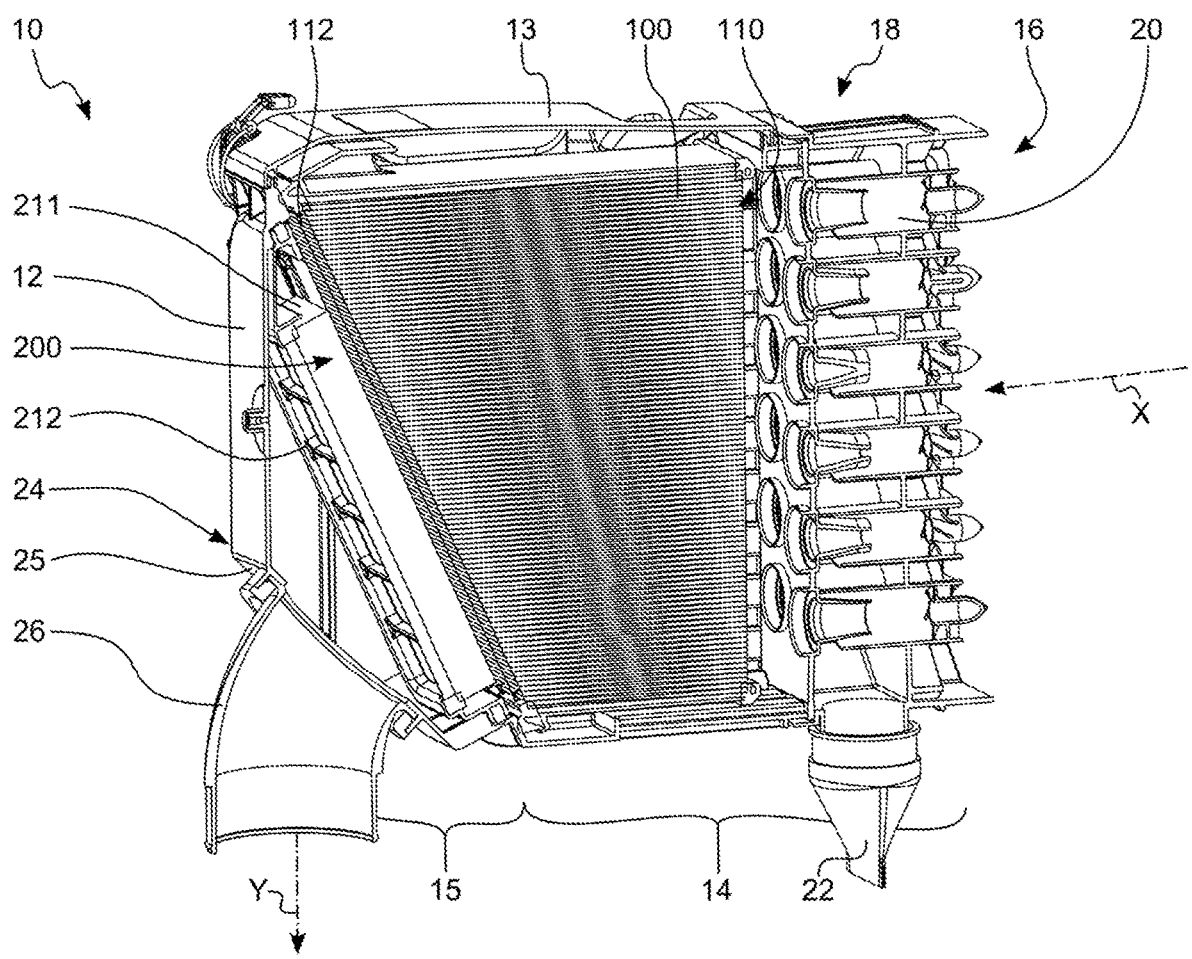
FIG. 1 is a perspective section illustration of an embodiment of a filter according to the invention with inserted main filter cartridge and secondary filter cartridge.
Figure 2:
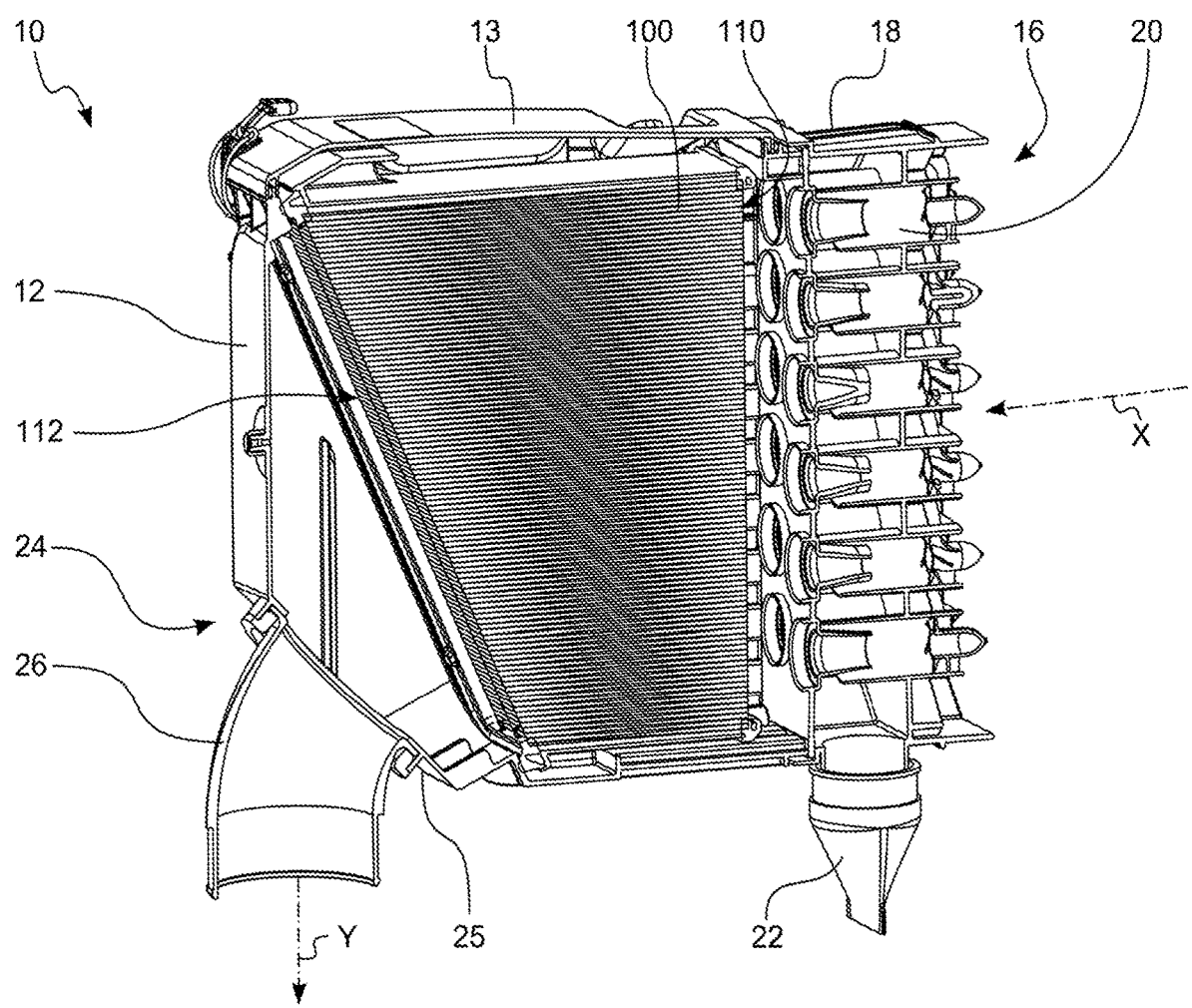
FIG. 2 shows the filter of FIG. 1 without inserted secondary filter cartridge.
Figure 3:
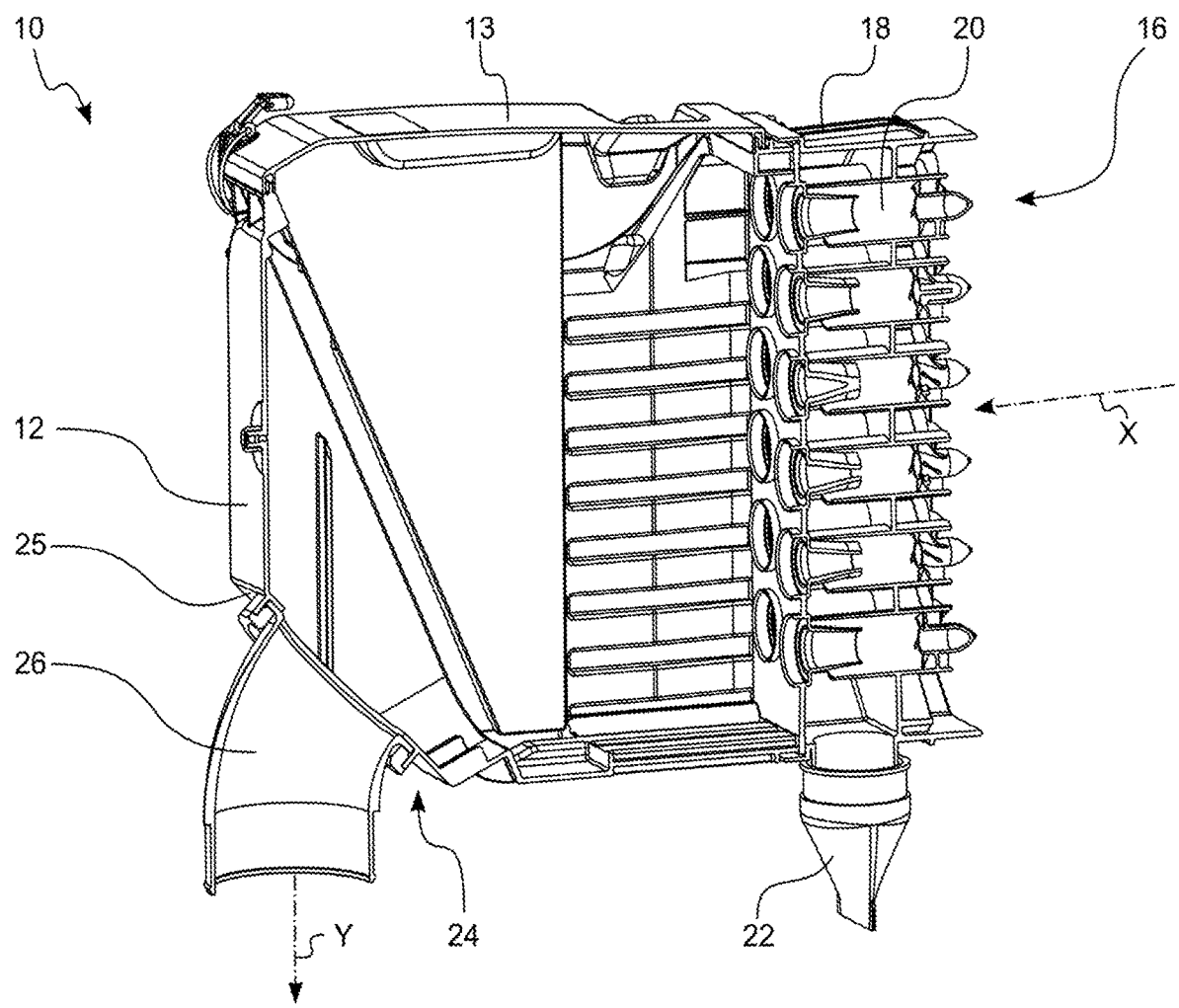
FIG. 3 shows the filter of FIG. 1 without inserted main filter cartridge.
Figure 4:
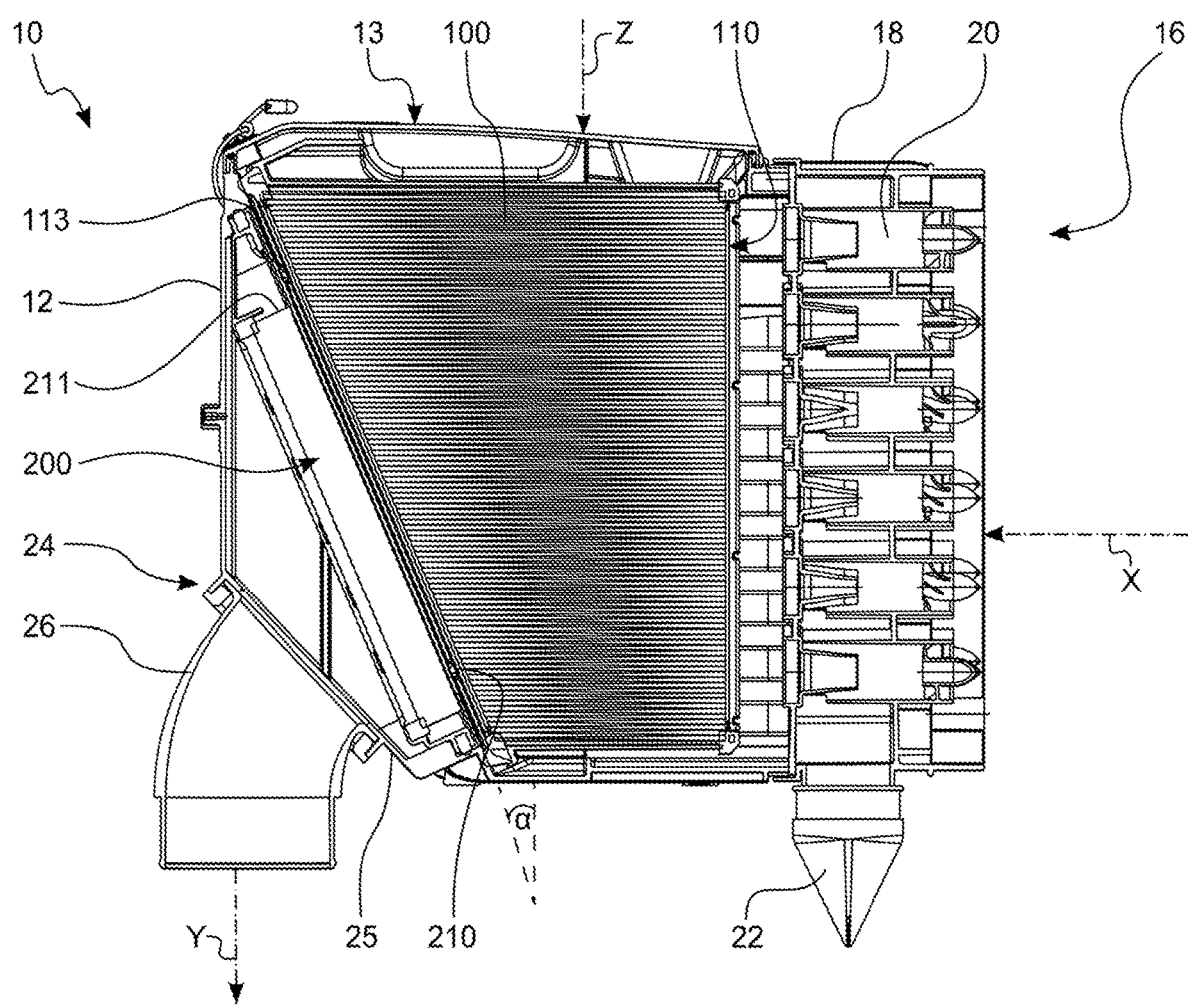
FIG. 4 shows the filter of FIG. 1 in a cross-sectional view.
Figure 5:
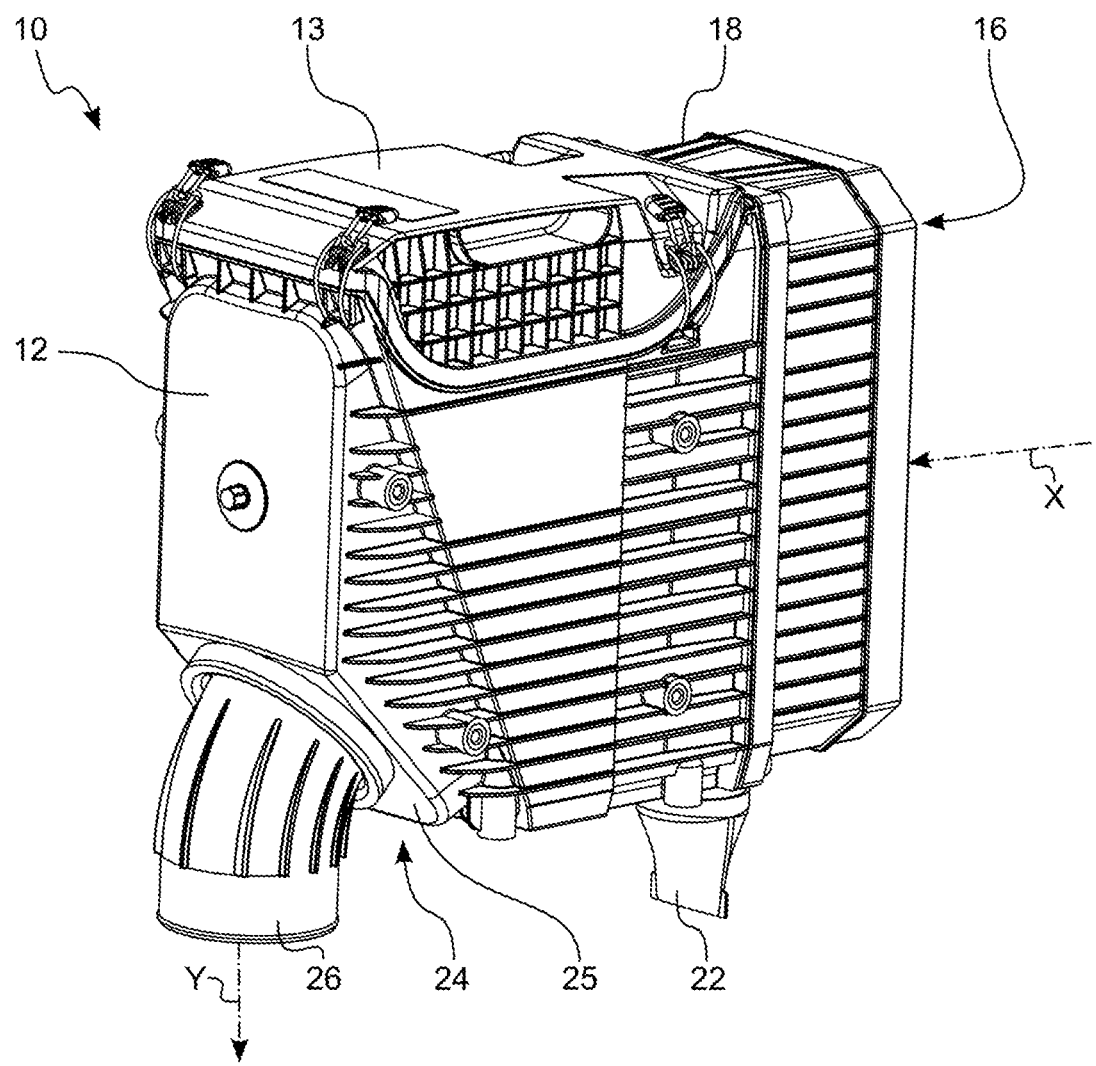
FIG. 5 is a perspective external view of the filter of FIG. 1 according to the invention.

With reference to FIGS. 1 through 5, an embodiment of a filter 10 according to the invention will now be described. Such a filter 10 can be used, for example, in an air intake manifold of a construction or agricultural machine, a compressor or another device with an internal combustion engine, for filtering a fluid, in particular air. The filter 10 comprises a filter housing 12 which can be divided roughly into a raw-side area 14 and a clean-side area 16.

The filter 100 is flowed through along a main inflow direction X. On an inflow side 16 the fluid to be filtered impacts on a coarse or a pre-separation module 18 which is designed in the present case as a cyclone block. In the cyclone block 18, a plurality of individual pre-separation cells 20 are connected in parallel in a so-called multi-cyclone block. The dust and/or water that has been pre-separated in the cyclone block 18 is removed through a discharge socket 22 from the filter housing 12.

Figure 15:
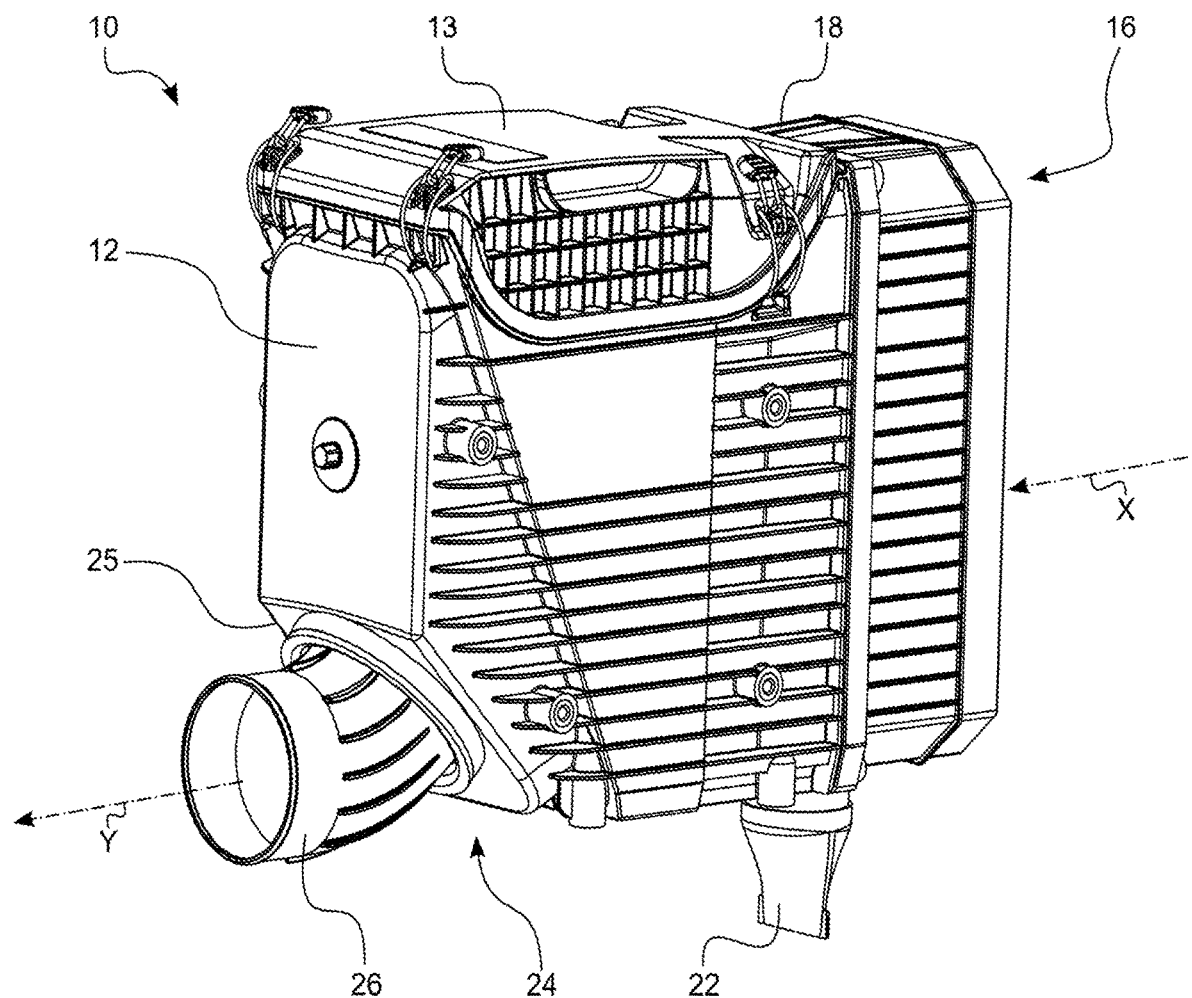
FIG. 15 is a perspective external view of the filter of FIG. 5 showing the outflow socket in a first position.
Figure 16:
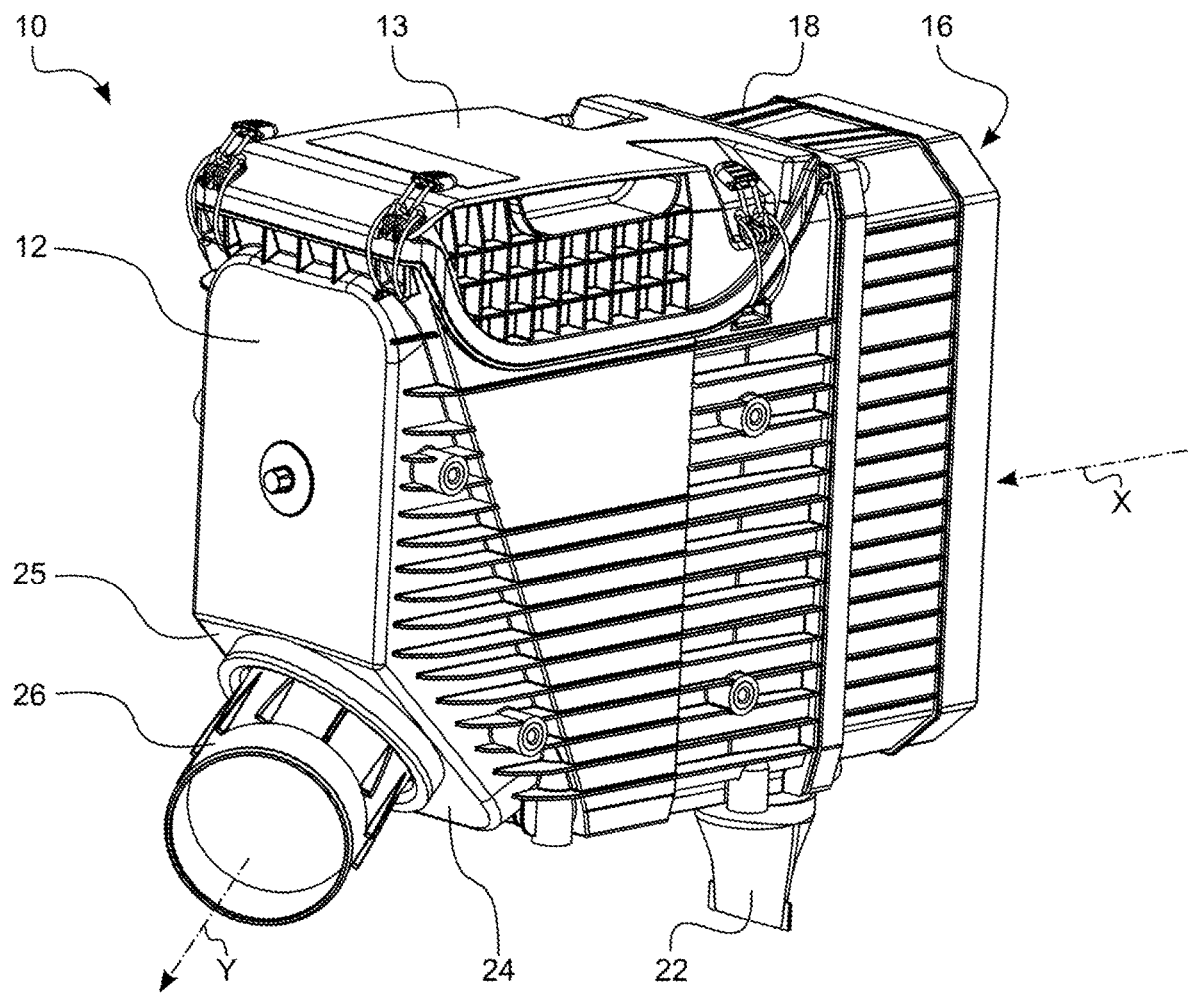
FIG. 16 is a perspective external view of the filter of FIG. 5 showing the outflow socket in a second position.
Figure 17:
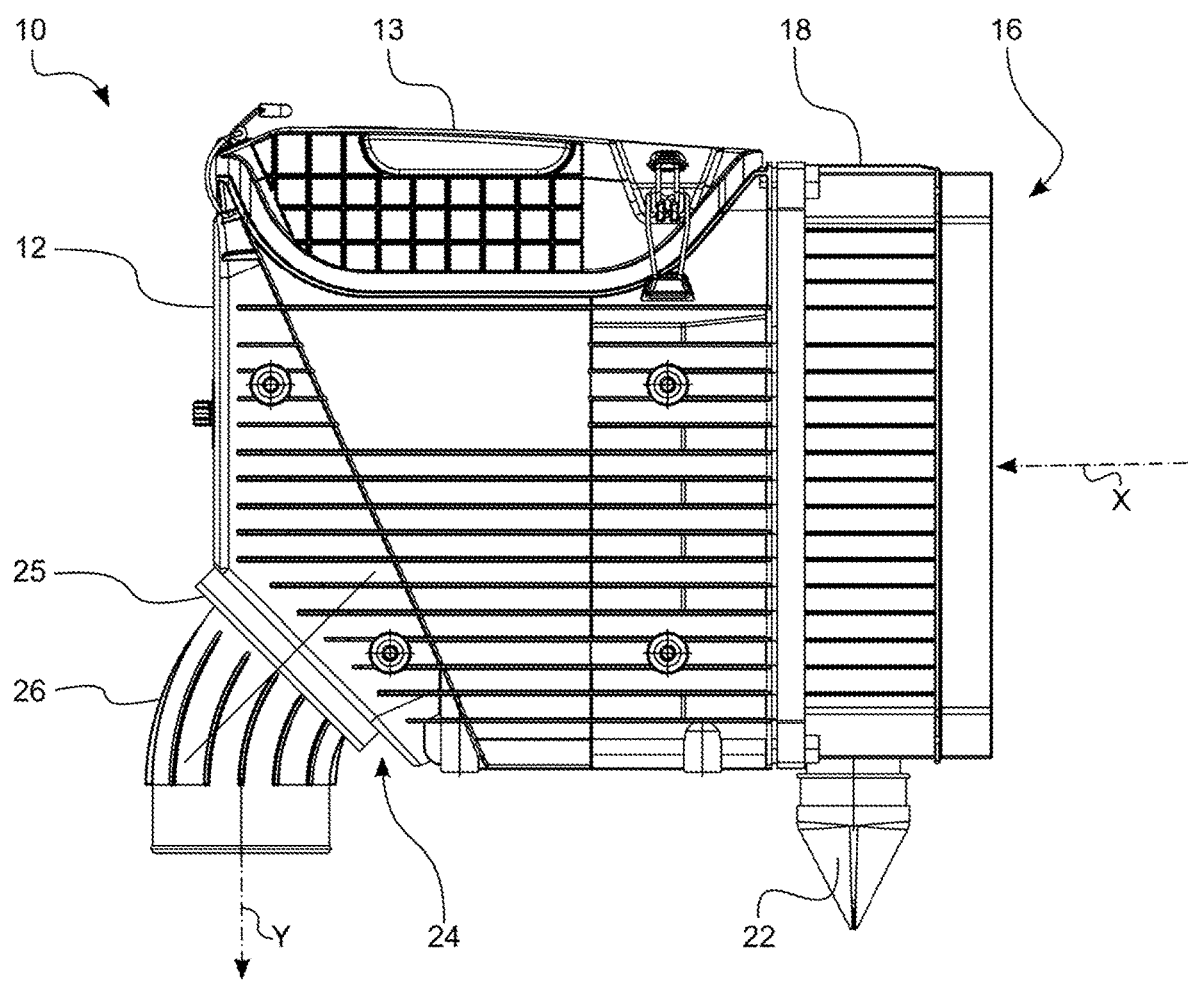
FIG. 17 shows a side view of the filter of FIG. 5.
Figure 18:
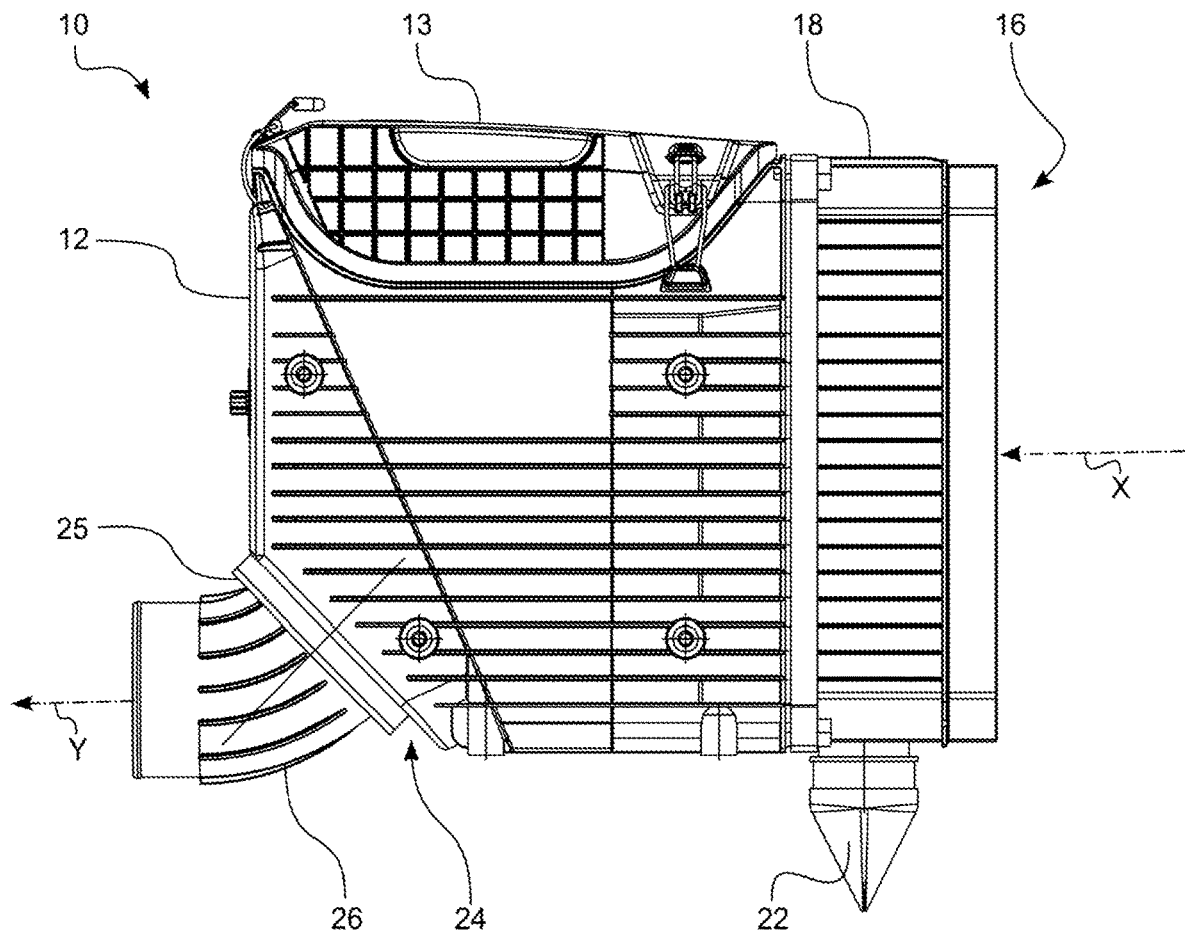
FIG. 18 shows a side view of the filter of FIG. 15.
Figure 19:
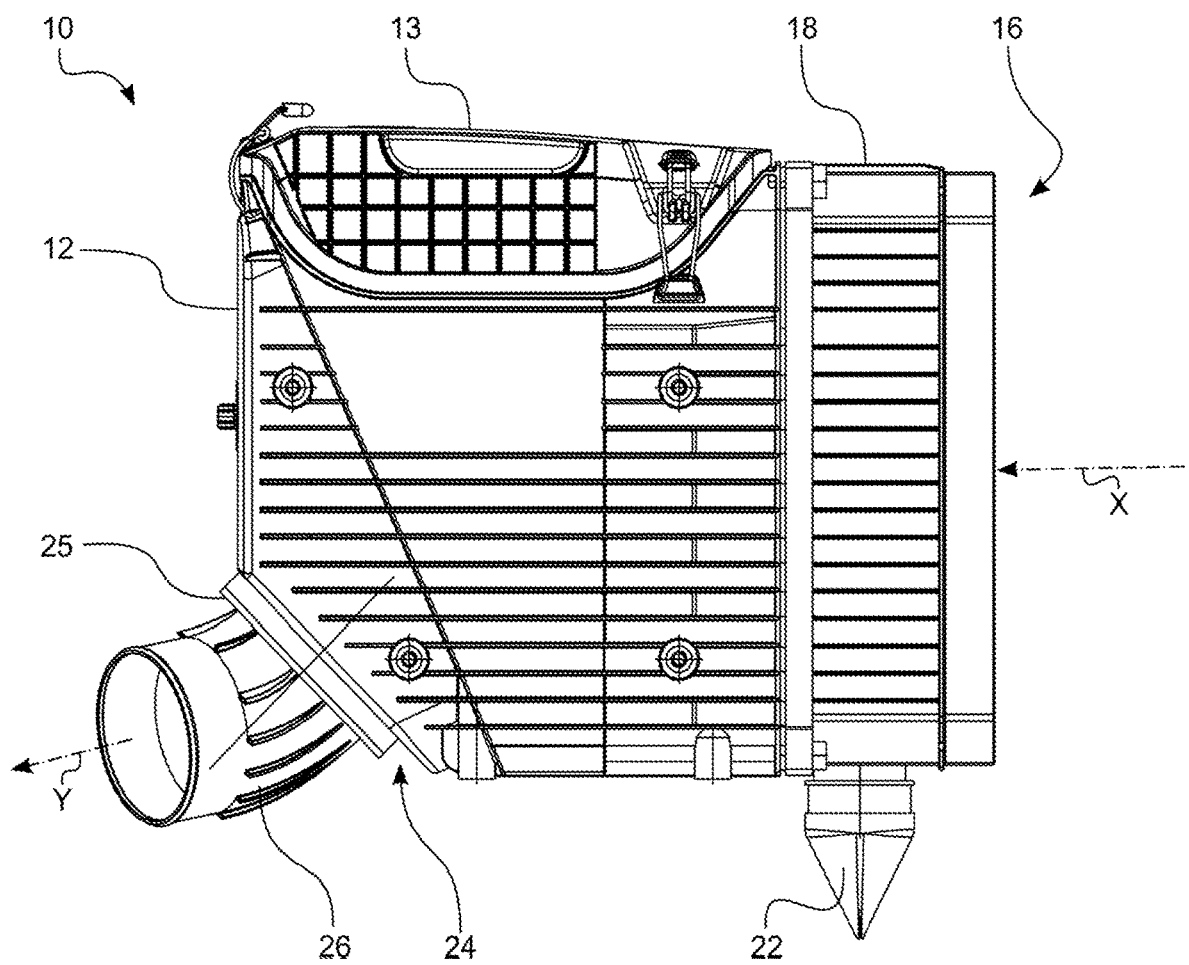
FIG. 19 shows a side view of the filter of FIG. 16.

Downstream of the cyclone block 18, the fluid to be filtered flows into the main filter cartridge 100. The main filter cartridge 100 is embodied in the present case as a prism. An inflow surface 110 of the main filter cartridge 100 is not positioned parallel to an outflow surface 112 of the main filter cartridge 100. Instead, the inflow surface 110 and the outflow surface 112 are positioned at an angle to each. In the present case, the inflow surface 110 of the main filter cartridge 100 is smaller with regard to the desired surface area than the outflow surface 112 of the main filter cartridge 100. At the outflow side of the main filter cartridge 100, a secondary filter cartridge 200 is provided in the filter housing 12. A main inflow surface 210 of the secondary filter element 200 is oriented toward the outflow surface 112 of the main filter cartridge 100 and in particular is arranged parallel thereto. An outflow surface 212 is oriented in this embodiment parallel to the main inflow surface 210 of the secondary filter cartridge 200. Due to the slanted position of the outflow surface 112 of the main filter cartridge 100, already upon inflow of the fluid from the main filter cartridge 100, but also upon inflow from the secondary filter cartridge 200, a deflection of the main flow direction X is occurring. Due to the outflow geometry of the filter housing 12 in the outflow area 24, the flowing fluid is deflected to the outflow direction Y and guided toward an outflow socket 26. In the present case, the main outflow direction Y is substantially perpendicular to the main inflow direction X. However, other outflow directions are conceivable also. This will be explained in more detail particularly in connection with FIGS. 15 to 19.

The main filter cartridge 100 comprises a main filter cartridge inflow surface 110, a main filter cartridge flow direction X1, a main filter cartridge outflow surface 112 as well as a seal 116 arranged on a sealing surface 114 for fluid-tight separation of the raw-side area 14 and of the clean-side area 16 of the filter housing 12. A secondary filter cartridge 200 with a secondary filter cartridge inflow surface 210, a secondary filter cartridge flow direction Y1, and a secondary filter cartridge outflow surface 212 is arranged downstream of the main filter cartridge 100. The sealing surface 114 of the main filter cartridge 100 is slantedly positioned relative to the main flow direction Y1 of the main filter cartridge 100. In particular, the sealing surface 114 is positioned at an angle α that is preferably between 5° and 45° (see FIG. 4). In particular, the angle amounts to 24°±10° and 24°±5°. In the present embodiment, the angle α is 24° (see FIG. 4).

The secondary filter cartridge inflow surface 210 extends substantially parallel and at a spacing to the sealing surface 114 of the main filter cartridge 100. The spacing is less than 2 cm; in the present embodiment, the spacing is 1 cm.

Figure 11:
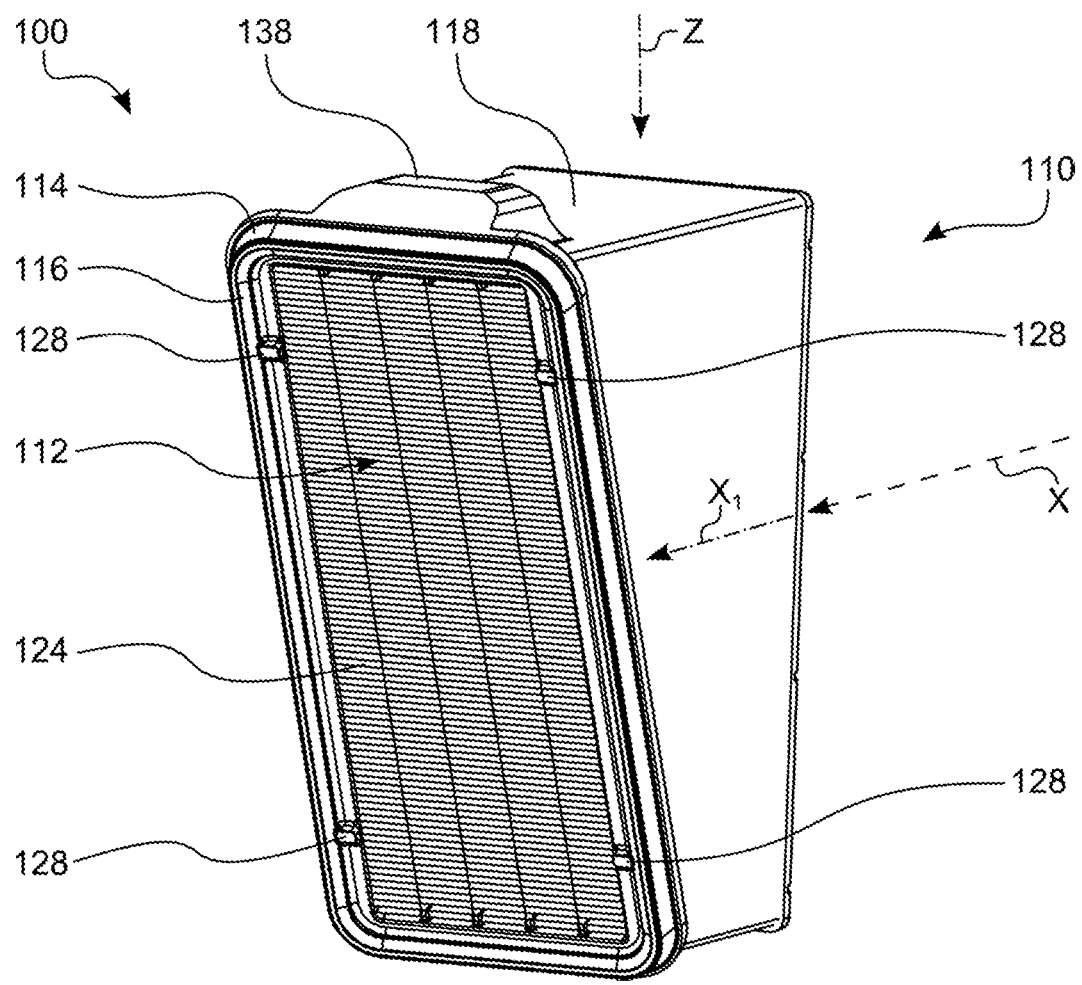
FIG. 11 is a perspective front view of a main filter cartridge according to the invention.
Figure 12:
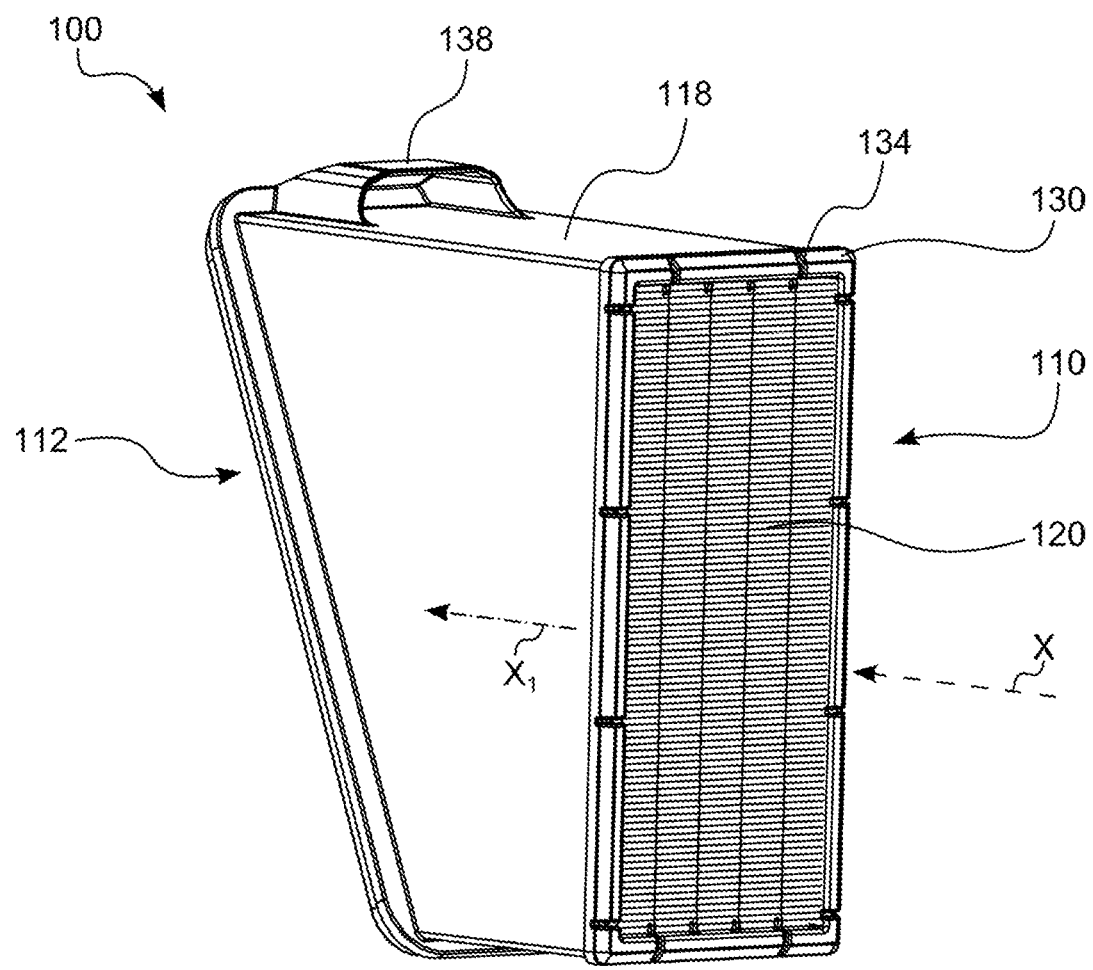
FIG. 12 is a perspective rear view of the main filter cartridge of FIG. 11.
Figure 13:
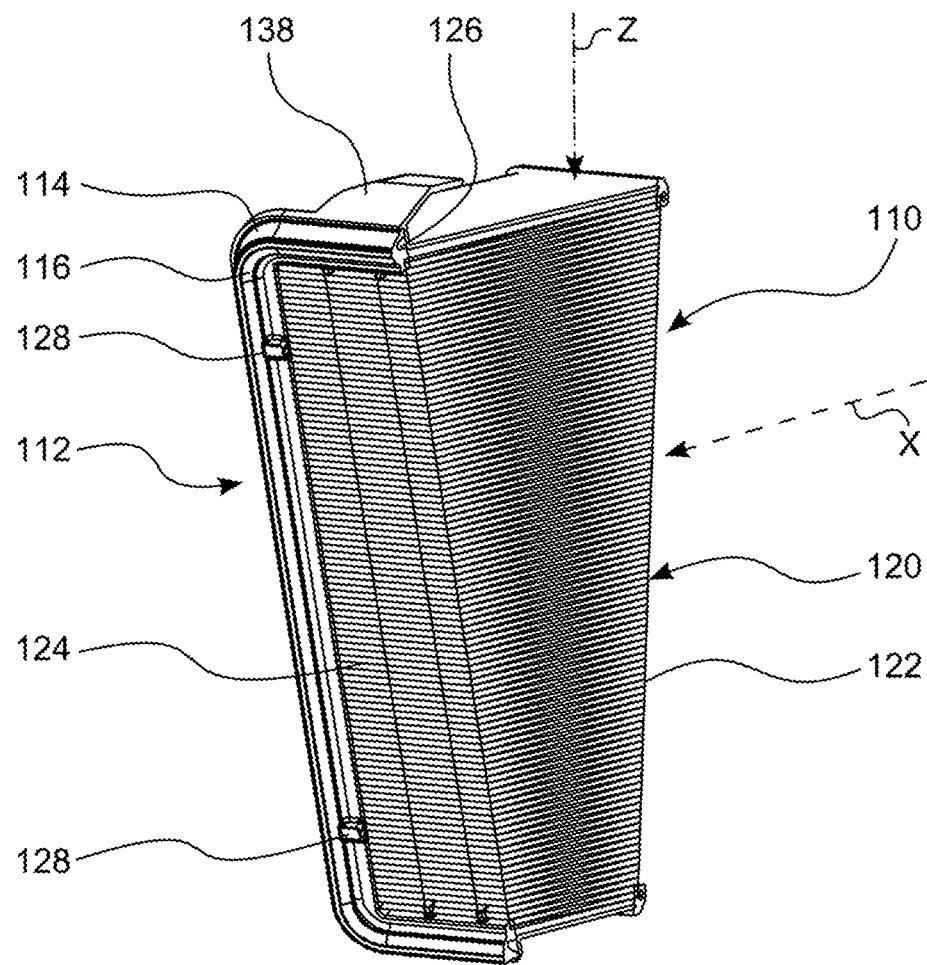
FIG. 13 is a perspective section view of the main filter cartridge of FIG. 11.
Figure 14:
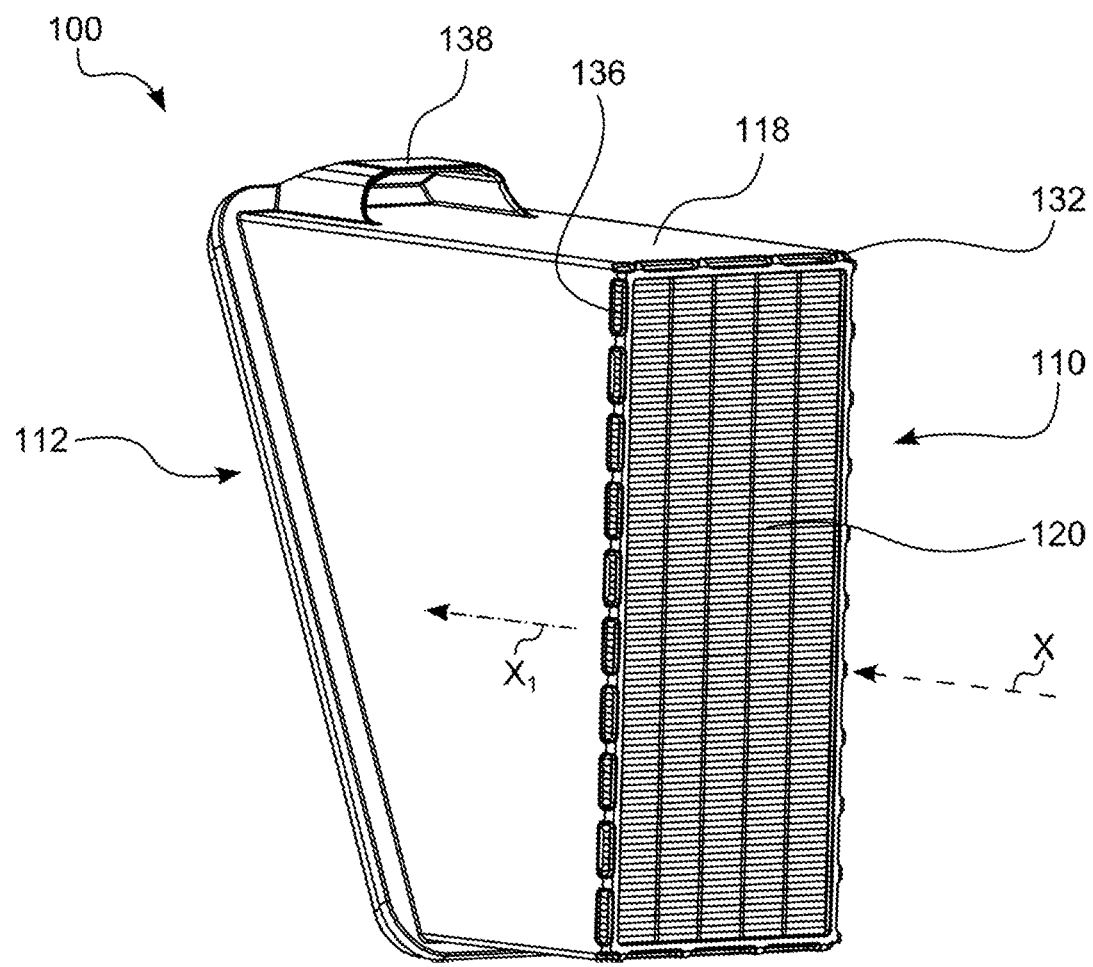
FIG. 14 is a perspective rear view of the main filter cartridge of FIG. 11 without edge protection.

FIGS. 11 to 14 show the main filter cartridge 100. The main filter cartridge 100 comprises an inflow surface 110 and an outflow surface 112. Inflow to the main filter cartridge 100 is occurring along a main inflow direction X and flow through it occurs along a main flow direction X1. The main filter cartridge 100 comprises a filter cartridge frame 118 that receives a filter body 120. The filter body 120 is in the present case embodied as a folded bellows. Inflow-side fold edges 122 are positioned opposite outflow-side fold edges 124. Inflow-side fold edges 122 and outflow-side fold edges 124 are positioned parallel, substantially perpendicular to the main flow direction X1, and substantially horizontally in FIGS. 11 to 14. This orientation of the fold edges 122, 124 enables a variation of the fold depth in the direction of an insertion direction Z. Along the insertion direction Z, the main filter cartridge 100 is insertable into the filter housing 12 of the filter 10. In the present embodiment, the fold height is reduced along the insertion direction Z. This effects a tilting of the inflow surface 110 relative to the outflow surface 112.

In the area of the outflow surface 110, the filter frame 118 has a sealing surface 114 along which a circumferentially extending seal 116 is provided. The seal serves for separating the raw-side area 14 from the clean-side area 16 in the filter housing 12 of the filter 10 when the main filter cartridge 100 is inserted into the filter 10. The seal 112 comprises substantially a U-shape in cross-section.

For reinforcement and better mechanical connection of the seal 116 to the filter frame 118, a web 126 is provided which engages the U-shape of the seal 116. At the same time, the seal 116 can contact the filter body 120 or penetrate it so that an adhesive connection of the filter body 120 with the filter cartridge frame 118 and a fluid-tight sealing action between filter body 120 and filter cartridge frame 118 are generated at the same time.

Moreover, the seal 116 comprises a spacer structure which is embodied in the present case in the form of a plurality of support knobs 128. The support knobs 128 as elements of the support structure are components of the sealing material of the seal 116. As can be seen in the cross-sectional view of FIG. 4, the support knobs 128 contact the secondary filter cartridge 200, in particular a secondary filter cartridge frame, when main filter cartridge 100 and secondary filter cartridge 200 are inserted in the filter housing 12 of the filter 10. In this state, the secondary filter cartridge 200, even for vibration excitation that can be transmitted, for example, through the filter housing 12, cannot move out of a seal seat in the filter housing 12. Also, by means of the support knobs 128 it is ensured that the secondary filter cartridge 200 after installation of the main filter cartridge 100 and closure of the cover 13 is seated in the correct position in the filter housing 12.

A plurality of the support knobs 128 are positioned along the seal 116 on the side which is facing the outflow surface 112. They can be produced, for example, integrally with the seal 116 when producing the seal 116.

The seal 116 is located at the outflow surface 112 of the main filter cartridge 100 and acts in a direction that is perpendicular to the outflow surface 112, i.e., substantially axially along the main flow direction X1.

The main filter cartridge 100 comprises at its inflow side 110 an edge protection 130 which is extending externally circumferentially about the filter frame 118. The edge protection 130 is designed such that upon tapping of the main filter cartridge 100, for example, for cleaning, impacts against the filter frame 118 can be absorbed and at least partially compensated. In this way, breakage of the filter frame 118 or other damages of the filter cartridge 100, for example, of the filter body 120, can be avoided. The edge protection 130 extends circumferentially about the inflow-side edge of the filter frame 118. In this context, individual interruptions, for example, the notches 134, can be provided. The notches 134 are generated when producing the edge protection 130. In this context, the filter frame 118 together with filter body 120 is positioned in a casting mold. Webs secure a spacing between the casting mold bottom and the filter body 120 and cause the formation of the notches 134 during the casting process.

Cutouts 136 are provided at the inflow-side edge 132. The cutouts 136 penetrate the sidewalls of the filter frame 118 and extend thus perpendicular to the main flow direction X1. During the already mentioned casting process, the casting material for the edge protection 130 penetrates the cutouts 136, contacts the inner walls of the filter cartridge frame 118 and in particular the filter body 120. In this way, a fluid-tight sealing action between the filter body 120 and the filter cartridge frame 118 and at the same time an adhesive connection of the two components is produced. Accordingly, the edge protection 130 is monolithically produced with the adhesive connection between the filter body 120 and the filter cartridge frame 118 and an also required sealing action between the two components. The edge protection 130 can be produced, for example, of a foaming polyurethane. However, also silicone-based material systems are conceivable.

The filter cartridge 100 comprises a grip 138. The grip 138 interacts with the cover 13 of the filter 10 and ensures reliable seating of the main filter cartridge 100 in the filter housing 12 and, at the same time, exerts pressure axially in the direction of the main flow direction X1 on the seal 116 and ensures in this way a fixed seal seat of the main filter cartridge 100 in the filter housing 12.

Figure 6:
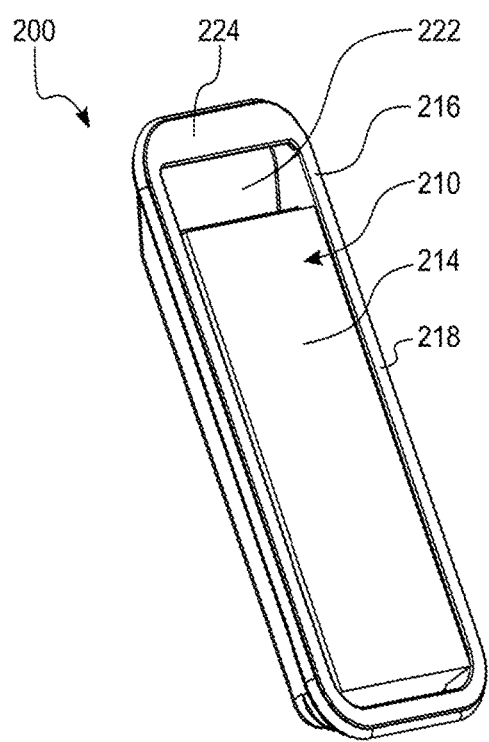
FIG. 6 is a perspective view of a secondary filter cartridge according to the invention with filter body.
Figure 6A:
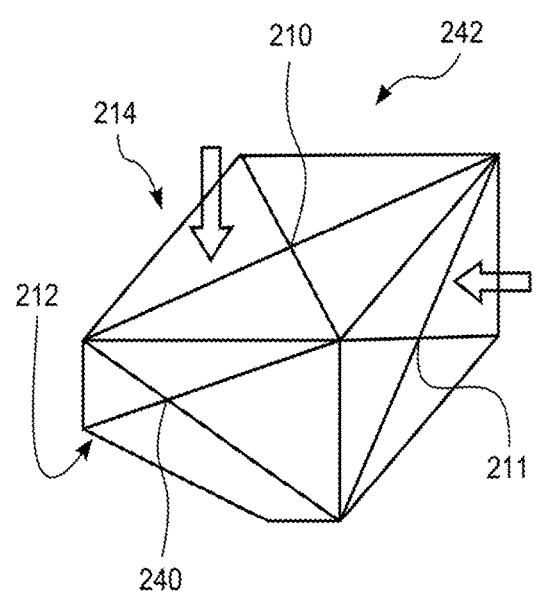
FIG. 6a is a perspective view of an alternative secondary filter cartridge filter body according to the invention.
Figure 7:
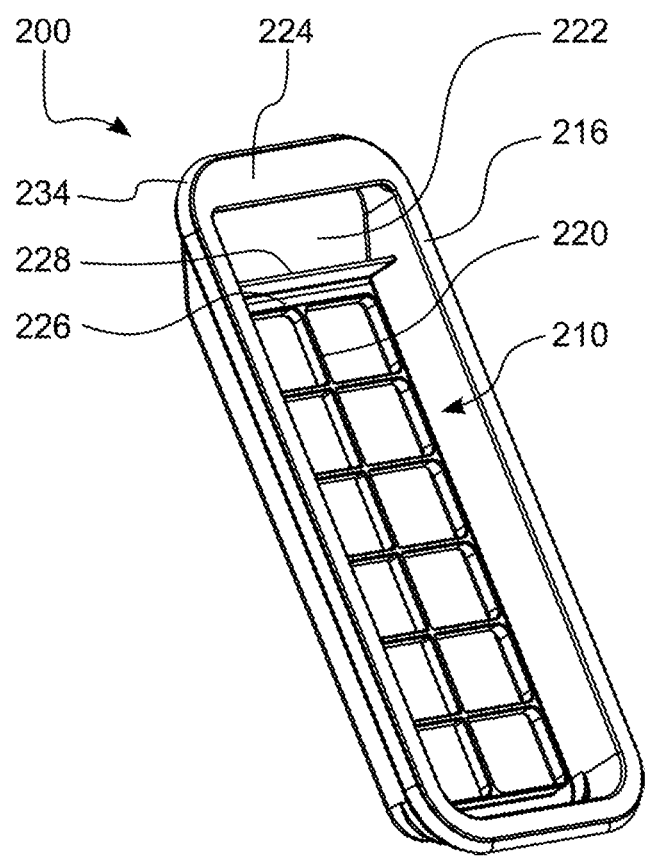
FIG. 7 is a perspective view of the secondary filter cartridge of FIG. 6 without filter body.
Figure 8:
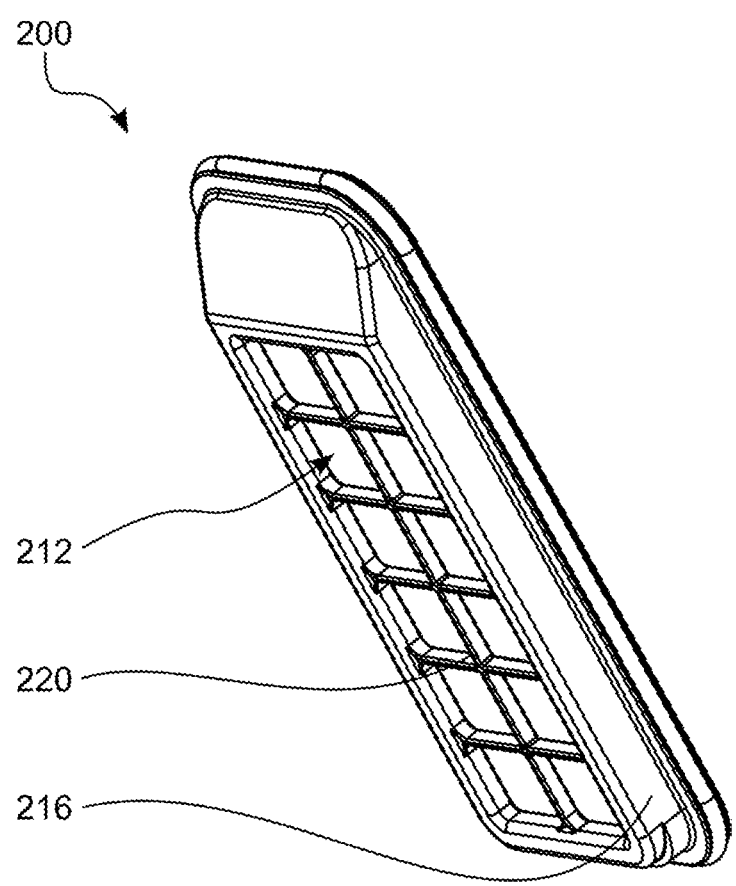
FIG. 8 is another perspective view of the secondary filter cartridge of FIG. 6 without filter body.
Figure 9:
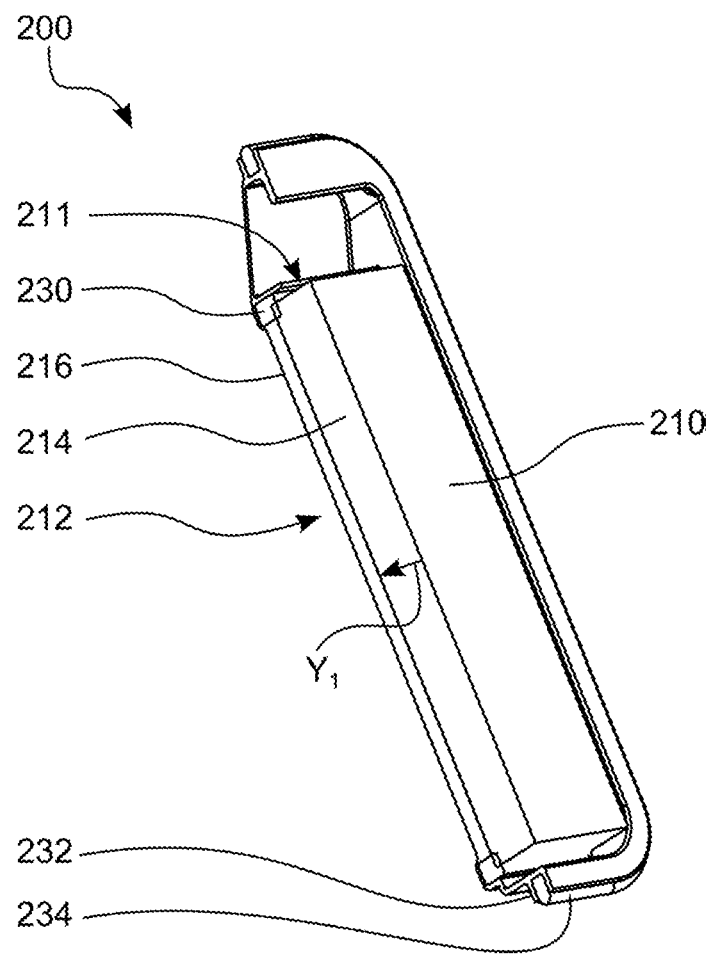
FIG. 9 is a perspective section view of the filter of FIG. 6.
Figure 10:
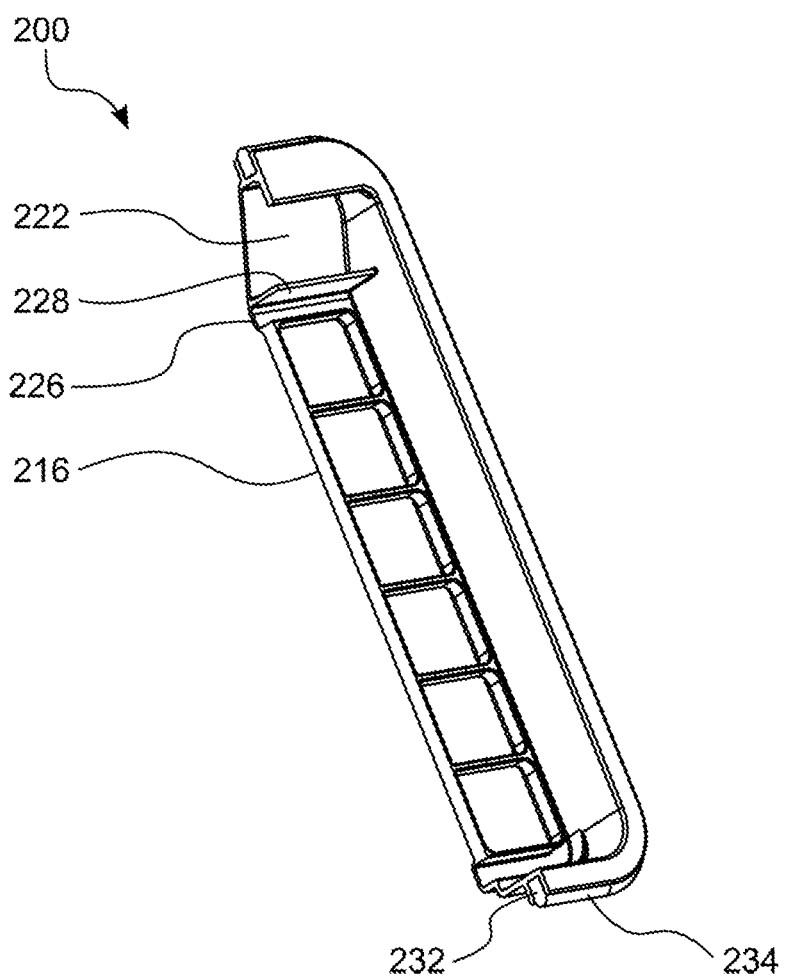
FIG. 10 is a section view of the filter of FIG. 7.

The FIGS. 6 to 10 show an embodiment of a secondary filter cartridge 200. The secondary filter cartridge 200 comprises a main inflow surface 210, an outflow surface 212 as well as a main flow direction Y1. Moreover, the secondary filter cartridge 200 comprises a filter body 214 which is supported by a filter cartridge frame 216. At the inflow side, the filter cartridge frame 216 with a frame area 218 circumferentially surrounding the filter body 214 is substantially flush with the filter body 214. The frame area 218 can serve, for example, as an abutment for the support knobs 128 of the main filter cartridge 100 in the inserted state of both filter cartridges 100, 200.

In the present embodiment, the filter body 214 is substantially parallelepipedal, However, other basic shapes like, for example, a prism are conceivable. At the outflow side, i.e., in the area of the outflow surface 212, the filter cartridge frame 216 is provided with a grate structure 220. The grate structure 220 covers the outflow surface 212 at least partially. In case of a high differential pressure between the inflow side 210 and the outflow side 212, the grate structure 220 prevents an undesirable bending or even falling out of the filter body 214.

At a narrow side of the parallelepipedal filter body 214, the filter cartridge frame 216 is provided with a grip depression 222. In order to provide for comfortable gripping in the grip depression 222 by the hand of a person who wants to exchange the secondary filter cartridge 200, the frame area 218 in the area of the grip depression 222 is widened to a grip stay 224. The width of the grip stay 224 is selected such in this context that a direct inflow of a fluid exiting from the main filter cartridge outflow side 112 toward the filter body 214 is possible in particular at the side which is facing the grip depression 222. This is easily apparent in particular also in the cross-sectional view of FIG. 4. Also, from the uppermost edge 113 of the main filter element outflow surface 112, exiting fluid can flow directly to the filter body 214 of the secondary filter cartridge 200. In this context, the fluid can enter in particular through the auxiliary inflow surface 211 into the filter body 214.

In this embodiment, the filter body 214 is designed as a filter bellows. The fold edges extend in this context parallel to the longitudinal axis of the secondary filter cartridge 200 so that the end faces of the folds form the auxiliary inflow surface 211. The fold edges of the folds form the main inflow surface 210 and the outflow surface 212. By the combination of grip depression 222 and filter bellows 214 with inflow laterally via the auxiliary inflow surface 211, the pressure losses at the secondary filter cartridge 200 can be reduced because the secondary filter cartridge 200 is matched significantly better to the flow guidance from the main filter cartridge 100 to the outflow socket in the filter housing 12. At the same time, the grate structure 220 at the outflow side 212 improves collapse resistance of the secondary filter cartridge 200. Moreover, by means of the integrated grip at the grip depression 222, an easy removal of the filter cartridge 200 is possible.

The secondary filter cartridge 200 comprises a filter frame 216 which provides a groove 226 extending circumferentially about the outflow-side rim of the filter body 214. At the same time, a web 228 is provided on the side of the filter cartridge frame 216 which is facing the grip depression 222. The groove 226 serves as a casting mold for a circumferentially extending adhesive connection and sealing action of the filter body 214 with the filter cartridge frame 216. The sealing action and adhesive connection are effected by a sealing material 230 (see FIG. 9). The sealing material 230 can be, for example, a foaming polyurethane. However, also silicone-based material systems are conceivable.

The groove 226 and additionally the web 228 ensure good mechanical coupling of the sealing material 230 on the filter cartridge frame 216. This configuration has moreover the advantage that after introduction of the sealing material 230 into the groove 226 and insertion of the filter body 214 into the filter cartridge frame 216 and a subsequent foaming and hardening, no further processing steps such as, for example, cutting to size of the sealing material 230, are required. Excess material can be absorbed partially by the filter body 214 or can reach the intermediate area between filter body 214 and filter cartridge frame 216 without this being disadvantageous.

The depth of the groove 226 extends substantially along the main flow direction Y1 of the secondary filter cartridge 200. The outflow-side grate structure 222 can be formed as one part together with the filter cartridge frame 216.

At its inflow-side circumference, the filter cartridge frame 216 has a seal receiving groove 232. In this seal receiving groove 232, a seal 234 can be inserted that is, for example, manufactured of cellular rubber. The seal 234 is thus acting radially, i.e., perpendicular to the main flow direction Y1 of the secondary filter cartridge 200.

FIGS. 15 to 19 show the filter 10 with different orientations of the outflow socket 26. The filter housing 12 of the filter 10 comprises in the outflow area 24 a fastening area 25. The fastening area 25 is positioned relative to the main inflow direction X of the filter housing 12 at an angle of approximately 45°. An outflow socket 26 can be attached to the fastening area 25. The outflow socket 26 is shaped such that a fluid flowing through the outflow socket 26 is subjected to a deflection of 45°. The outflow socket 26, prior to final attachment on the fastening surface 25, is rotatably attachable. Accordingly, at a very late point in time in the manufacture of the filter 10 the final deflection direction or outflow direction Y of the filter 10 can then be determined. In the geometry shown in this embodiment, an inline flow (FIG. 15, FIG. 18), a deflection by 90° (FIG. 17) as well as intermediate angle ranges are possible. In the angle ranges that are between the extreme angles, an additional lateral deflection occurs.

What is claimed is:

1. A filter cartridge for a filter for filtering a fluid, the filter cartridge, comprising:
   a filter body of a zig-zag folded filter medium, forming a filter bellows, having:
      an inflow surface on a first axial side of the filter body;
      an outflow surface on a second axial side of the filter body; and
      a main flow direction extending axially from the inflow surface to the outflow surface;
   wherein folds of the zig-zag folded filter medium have:
      inflow folding edges arranged on the inflow surface;
      outflow folding edges arranged on the outflow surface;
   wherein each fold has a fold height defined as a distance from the inflow folding edge to the outflow folding edge; and
   wherein the fold height of the zig-zag folded filter medium is not constant but changes across a length of the zig-zag folded filter medium;
   wherein the inflow folding edges and the outflow folding edges extend across the filter body of a zig-zag folded filter medium in a fold direction;

wherein the filter body has radially outer sides which extend from the inflow surface to the outflow surface;

wherein the fold height of folds increases in a direction traverse to the fold direction from a first radially outer side of the filter body to an opposite second radially outer side of the filter body, such that the outflow surface is slanted at a slant angle relative to the inflow surface, and the slant angle is between 5 degrees and 45 degrees; and a filter cartridge frame supporting the filter body, the filter cartridge frame circumferentially closing around and covering the radially outer sides of the zig-zag folded filter medium at least a portion of a distance between the inflow surface and the outflow surface;

wherein the filter cartridge frame includes:
  a circumferential seal disposed on the filter cartridge frame at or adjacent to the outflow surface and configured to separate a filter interior of a filter into a clean side and a raw side;
  wherein the outflow surface and a sealing surface of the circumferential seal are both positioned relative to the inflow surface at the slant angle;
  an edge protection ring arranged at or adjacent to the inflow surface, the edge protection ring circumferentially surrounding the inflow surface and the filter cartridge frame,
  wherein the edge protection ring projects outwardly away from the filter body and beyond the inflow surface, such that, when tapping the filter cartridge, the resulting forces can be at least partially absorbed by the edge protection ring, avoiding damage of the filter cartridge.

2. The filter cartridge according to claim 1, wherein a spacer structure is arranged on the outflow surface and radially within the circumferential seal, the spacer structure comprises
  a plurality of support knobs, spaced apart and projecting outwardly away from the outflow surface.

3. The filter cartridge according to claim 2, wherein the plurality of support knobs are spaced apart and arranged at a plurality of locations along a radially inner side of the circumferential seal.

4. The filter cartridge according to claim 2, wherein the spacer structure is arranged at an outer circumference of the outflow surface of the zig-zag folded filter medium of the filter body.

5. The filter cartridge according to claim 2, wherein the spacer structure is configured to exert, in an installed state of the filter cartridge in a filter, a force on a further downstream filter cartridge in the main flow direction, the spacer structure pressing against the further downstream filter cartridge, urging the further downstream filter cartridge into an installation position.

6. The filter cartridge according to claim 1, wherein the circumferential seal is configured to act axially in the main flow direction.

7. The filter cartridge according to claim 1, wherein the edge protection ring forms a connection connecting the filter body and the filter cartridge frame with each other and the connection is seal-tight, preventing flow between the filter body and filter cartridge frame.

8. The filter cartridge according to claim 1, wherein the filter cartridge frame surrounds the filter body and is elongated in the main flow direction from the inflow surface to the outflow surface.

9. The filter cartridge according to claim 8, wherein the filter body and the filter cartridge frame are connected by an adhesive connection and the adhesive connection is formed by the edge protection ring.

10. A filter for filtering a fluid, the filter comprising
a filter housing;
a filter cartridge according to claim 1 as a main filter cartridge of the filter, the filter cartridge arranged in the filter housing;
a secondary filter cartridge arranged in the filter housing downstream of the main filter cartridge relative to a main flow direction through the filter cartridge;
wherein the circumferential seal seals between the main filter cartridge and the filter housing, preventing flow from bypassing the main filter cartridge in the filter housing and separating a filter interior of the filter housing into a clean side and a raw side.

11. The filter according to claim 10, wherein the filter housing is configured to permit insertion of the filter cartridge into the filter housing in a direction substantially perpendicular to the main flow direction.

12. The filter according to claim 10, wherein the secondary filter cartridge comprises
  a seal configured to contact the filter housing,
    wherein the seal of the secondary filter cartridge is configured to act radially relative to a flow direction of the secondary filter cartridge and radially relative to the main flow direction.

13. The filter according to claim 12, wherein when the main filter cartridge and the secondary filter cartridge are installed in the filter housing, the main filter cartridge contacts against the seal of the secondary filter cartridge.

* * * * *